US012699872B1

(12) United States Patent
Huynh et al.

(10) Patent No.: US 12,699,872 B1
(45) Date of Patent: Aug. 4, 2026

(54) DEBUGGING NEURAL NETWORK EXECUTION THROUGH OPERATION BACKTRACKING

(71) Applicant: Amazon Technologies, Inc., Seattle, WA (US)

(72) Inventors: Jeffrey T. Huynh, San Jose, CA (US); Ron Diamant, Santa Clara, CA (US); Samuel Jacob, Fremont, CA (US); Richard John Heaton, San Jose, CA (US); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1260 days.

(21) Appl. No.: 16/453,752

(22) Filed: Jun. 26, 2019

(51) Int. Cl.
  *G06N 3/04* (2023.01)
  *G06N 3/08* (2023.01)
(52) U.S. Cl.
  CPC ................. *G06N 3/04* (2013.01); *G06N 3/08* (2013.01)
(58) Field of Classification Search
  CPC ............ G06N 3/04; G06N 3/048; G06N 3/08; G06N 3/084
  See application file for complete search history.

(56) References Cited

U.S. PATENT DOCUMENTS

| | | | | |
|---|---|---|---|---|
| 10,185,914 B2 * | 1/2019 | Stone | .................... | G06N 3/04 |
| 2016/0342892 A1 * | 11/2016 | Ross | .................. | G06F 15/8046 |
| 2018/0293713 A1 * | 10/2018 | Vogels | ................ | G06V 10/764 |
| 2018/0314936 A1 * | 11/2018 | Barik | ...................... | G06N 5/01 |
| 2019/0114533 A1 * | 4/2019 | Ng | ........................... | G06N 3/10 |
| 2020/0012866 A1 * | 1/2020 | Burghouts | ............ | G06F 16/739 |
| 2020/0327420 A1 * | 10/2020 | Aralikatte | ............... | G06N 3/04 |
| 2020/0356905 A1 * | 11/2020 | Luk | ...................... | G06N 3/045 |
| 2020/0371856 A1 * | 11/2020 | Zhang | ................ | G06F 11/0754 |

* cited by examiner

*Primary Examiner* — Li B. Zhen
*Assistant Examiner* — Tirumale K Ramesh
(74) *Attorney, Agent, or Firm* — Kilpatrick Townsend & Stockton LLP

(57) ABSTRACT

Techniques are disclosed for debugging a neural network execution through operation backtracking. Operations of a neural network may be executed using an array of processing elements based on an input feature map to generate an output value of an output feature map. The operations may also be executed using a reference processor based on the input feature map to generate a reference output value. A first set of operations may be identified that relate a first set of contributing values of a first intermediary feature map to the output value. A second set of operations may be identified that relate a second set of contributing values of a second intermediary feature map to the first set of contributing values. The second set of contributing values may be compared to a second set of reference contributing values to detect a computation error related to the neural network execution.

16 Claims, 16 Drawing Sheets

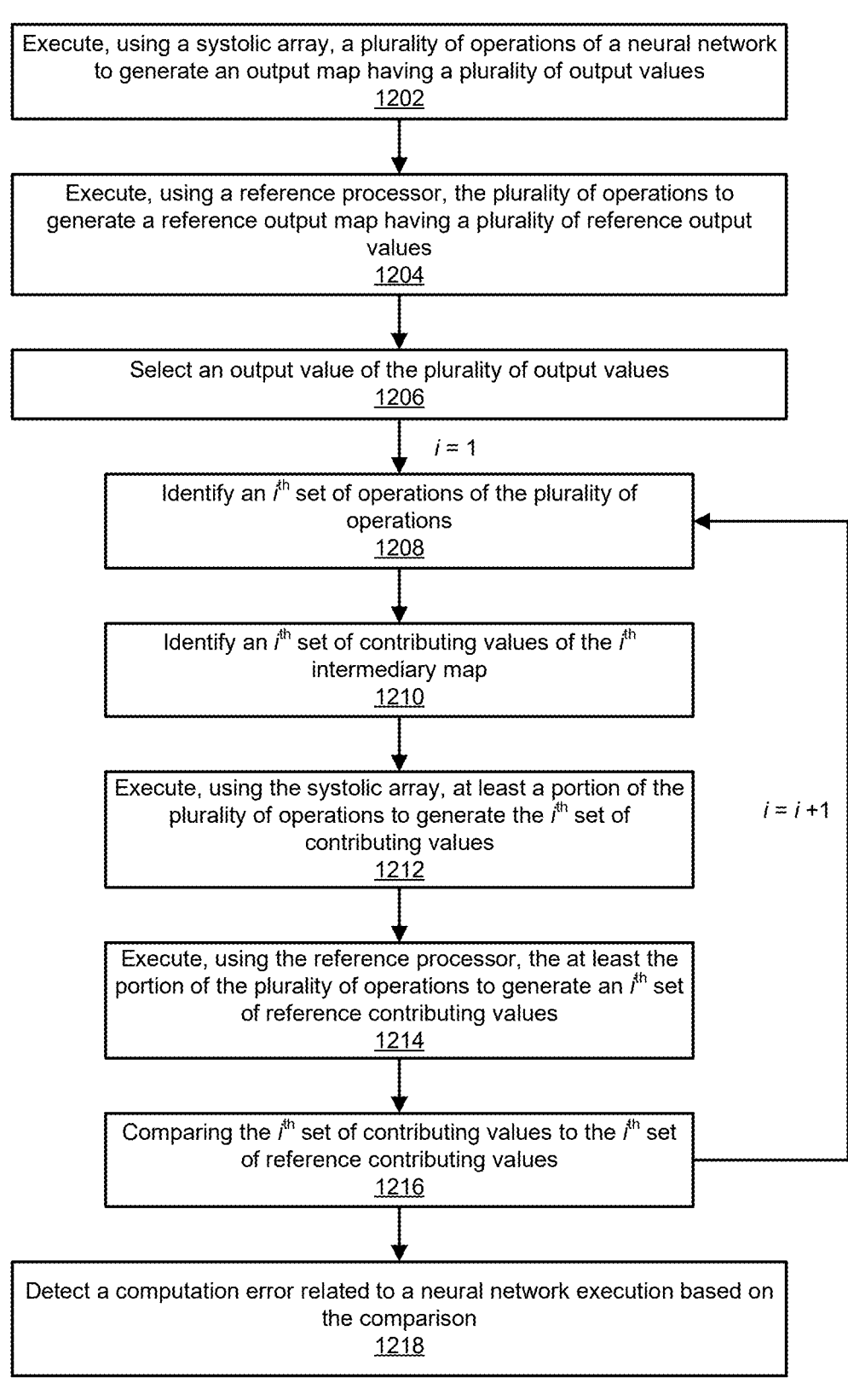

Execute, using a systolic array, a plurality of operations of a neural network to generate an output map having a plurality of output values
1202

Execute, using a reference processor, the plurality of operations to generate a reference output map having a plurality of reference output values
1204

Select an output value of the plurality of output values
1206

$i = 1$

Identify an $i^{th}$ set of operations of the plurality of operations
1208

Identify an $i^{th}$ set of contributing values of the $i^{th}$ intermediary map
1210

Execute, using the systolic array, at least a portion of the plurality of operations to generate the $i^{th}$ set of contributing values
1212

Execute, using the reference processor, the at least the portion of the plurality of operations to generate an $i^{th}$ set of reference contributing values
1214

Comparing the $i^{th}$ set of contributing values to the $i^{th}$ set of reference contributing values
1216

$i = i + 1$

Detect a computation error related to a neural network execution based on the comparison
1218

DEBUGGING NEURAL NETWORK EXECUTION THROUGH OPERATION BACKTRACKING

BACKGROUND

Debugging is an important step for improving the functionality of computing devices at the hardware or software level. As both computing devices and the software operating on them have become more complex, the debugging techniques have also expanded with more methods to detect so-called errors, bugs, or defects. Some debugging techniques include setting a breakpoint at some location within the source code of an application so as to stop or pause the application in place while different variables and data structures associated with the application can be examined. While such techniques are useful in simple systems, they provide less value for a complex system, such as a systolic array executing a neural network.

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network, such as a deep neural network, may include thousands or more of processing nodes and millions or more of parameters.

Processors employing systolic-array architectures can execute neural networks significantly faster than conventional processors. Some architectures allow for pairing a high-bandwidth computational engine with a lower-bandwidth memory subsystem, by exploiting the regularity and data-reuse in matrix multiplications and convolutions. One feature of systolic arrays is that they allow data to be read once from the memory, and then used multiple times by a network of tightly coupled processing elements.

BRIEF DESCRIPTION OF THE DRAWINGS

Various embodiments in accordance with the present disclosure will be described with reference to the drawings, in which:

FIG. 12 illustrates an example method for debugging a neural network execution through operation backtracking.

DETAILED DESCRIPTION

Figure 1:
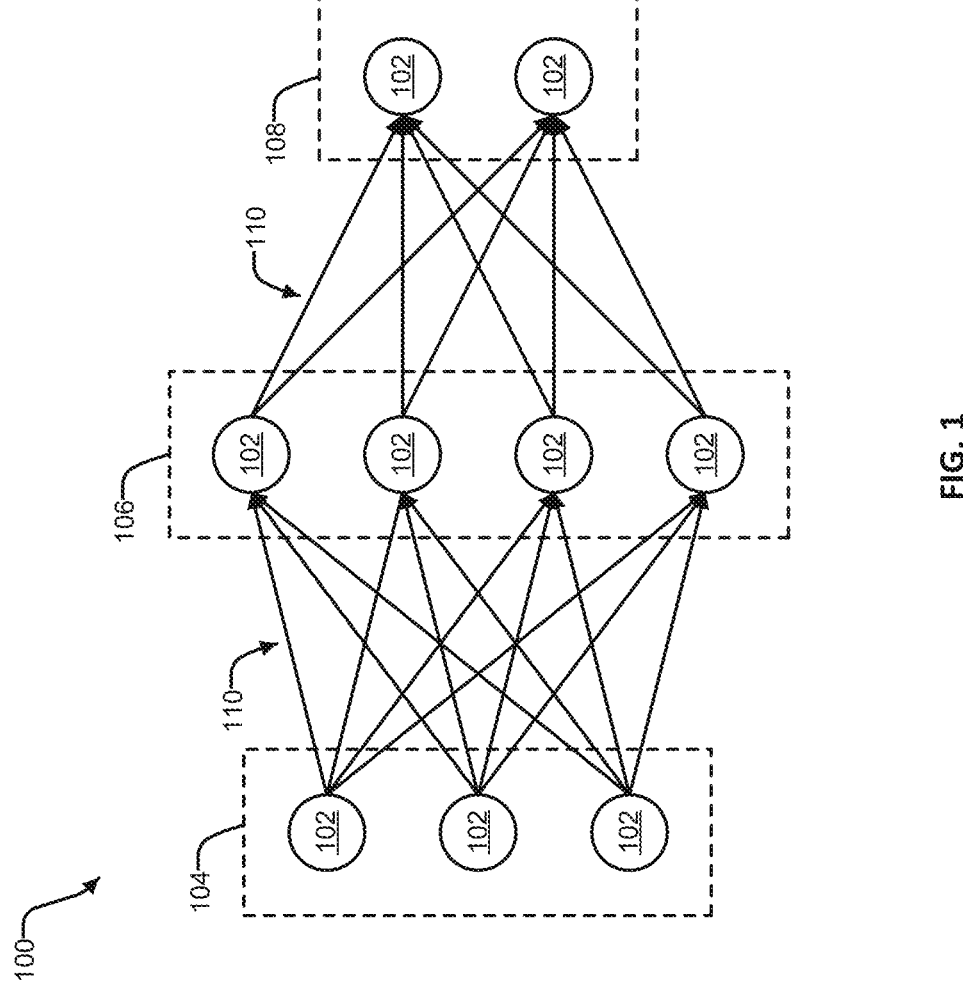
FIG. 1 illustrates an example of a computational flow model for a neural network.

Debugging neural network execution on a systolic array is challenging for a number of reasons. One reason is that many intermediary results are not directly accessible to a debugger program. Because systolic arrays can be comprised of thousands of individual data processing units (DPUs), it can be difficult to determine which DPU is defective when multiple DPUs are involved in the computation of a single output value. Furthermore, it can be difficult to detect a location of a precision-based summation error when each DPU output cannot be directly examined, particularly for execution of a neural network, which generally involves many parallel and sequential summations. Precision-based summation errors can occur when adding a sequence of finite precision floating point numbers. While these errors can be reduced in a model or reference computation by reordering the numbers from smallest to largest, the order in which summations are performed during execution of a neural network may be unalterable and therefore different than the reference computation.

Another challenge of debugging neural network execution on systolic arrays relates to the massive amount of computations to sort through. For example, for a single erroneous output value, there may be millions of computations that were performed over hundreds of layers and/or nodes of the neural network that contributed to the value. The sizes of the feature maps and the number of channels that may be employed increase the complexity of sorting through intermediary results. Neural networks can be implemented using many convolution operations, which interweave the dependencies of output values onto a vast set of input values and intermediary values.

Examples herein address these and other issues by providing techniques for debugging neural network execution on systolic arrays through operation backtracking. First, an output map is generated by executing the neural network on a systolic array. The output map is compared to a reference output map that may be generated using a reference processor. The output map is compared to the reference output map to identify any differences in particular values. In some examples, a value of an element of the output map ("output value") is found to differ from a value of a corresponding element of the reference output map ("reference output value") by more than an accuracy threshold.

Upon identifying the erroneous output value, a debugger program backtracks through the operations of the neural network, identifying sets of values that contribute to the computation of the output value ("contributing values") at different intermediary layers. Based on the operations that relate layers of the neural network, the size of the sets of contributing values can grow or decrease exponentially from layer to layer. The debugger program can trace convolution operations backwards based on the filter size of the convolution operation, the stride used in the convolution, and/or the amount of zero padding used in the convolution.

In some examples, the output map is linked to a first intermediary map having a first set of contributing values and then to a second intermediary map having a second set of contributing values. A first set of operations of the neural network may relate the first intermediary map to the output map and a second set of operations of the neural network may relate the second intermediary map to the first intermediary map. The debugger program can compare the first and second sets of contributing values to reference contributing values generated using the reference processor to detect a computation error. In some examples, the debugger program can perform a binary search to find the particular intermediary map containing the first computation error.

If the computation error is determined to have occurred during the performance of a particular set of operations, the debugger program can identify which portions of the systolic array are utilized during that set of operations and look for one or more defective DPUs. Alternatively or additionally, the debugger program can output the numerical computations performed for the particular set of operations to better help the user better understand the cause of the problem.

Various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene.

For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves such as Go. In robotics, neural networks have been used for motion planning of a robot, visual navigation, control stabilization, and driving strategies for autonomous vehicles.

Figure 2:
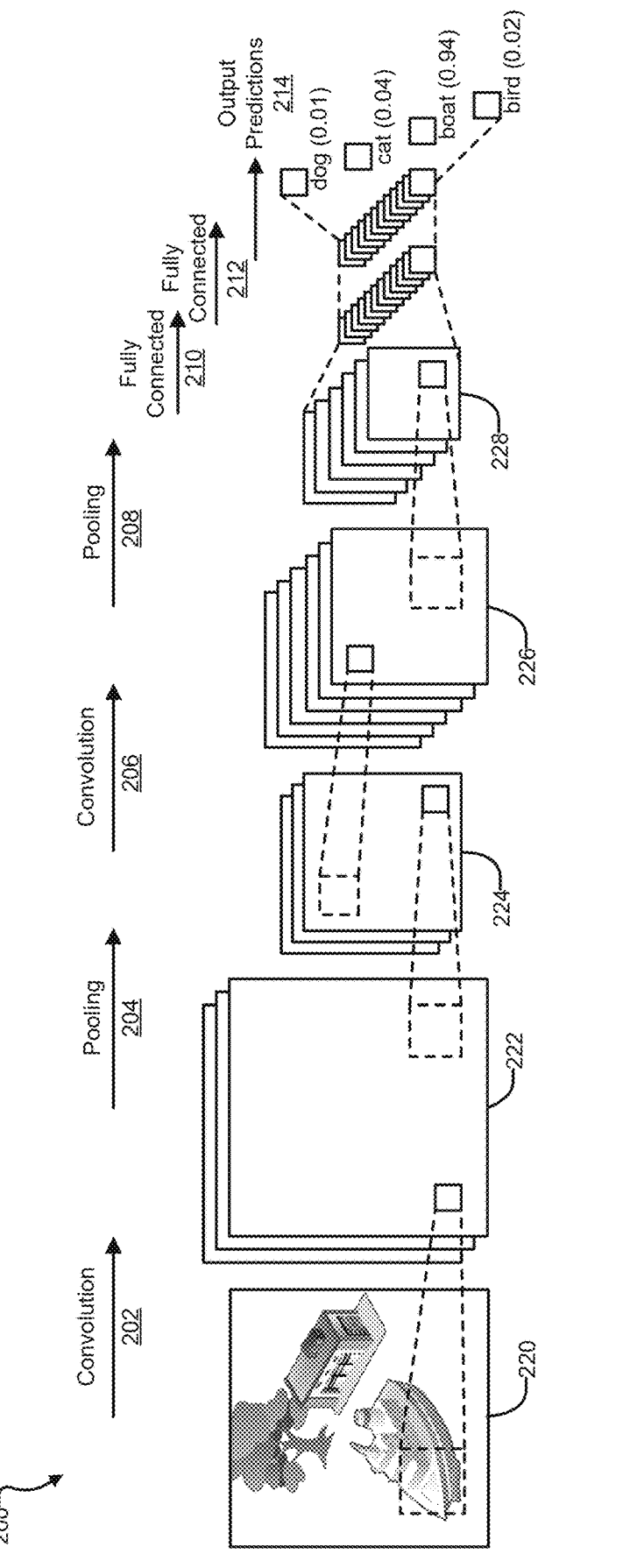
FIG. 2 illustrates an example configuration of a convolutional neural network.

FIG. 2 illustrates an example configuration of a convolutional neural network 200. The example of FIG. 2 illustrates operations that can be included in a convolutional neural network, including convolution, application of non-linearity, pooling or sub-sampling, and output generation (e.g., a fully connected layer). Any given convolutional network includes at least one convolution layer, and can have tens of convolution layers. Additionally, each convolutional layer need not be followed by a pooling layer. In some examples, a pooling layer may occur after multiple convolution layers, or may not occur at all. The example convolution network illustrated in FIG. 2 classifies an input image 220 into one of four categories: dog, cat, boat, or bird. In the illustrated example, on receiving an image of a boat as input, the example neural network outputs the highest probability for "boat" (0.94) among the output predictions 214.

To produce the illustrated output predictions 214, the example convolutional neural network performs a first convolution 202 that can also include application of non-linearity; a first pooling 204 operation; a second convolution 206 that may also include application of non-linearity; a second pooling 208 operation; and then categorization using a first fully-connected 210 layer and a second fully-connected 212 layer. The output of the first convolution 202 is a set of one or more output feature maps 222, which are provided as inputs to the first pooling 204 operation. The first pooling 204 operation produces a set of feature maps 224 that are provided as inputs to the second convolution 206. The second convolution 206 also produces a set of output feature maps 226, which can describe the input image 220 at a more abstract level. The second pooling 208 step also produces feature maps 228, which are input into the first fully-connected 210 layer. The first fully-connected 210 layer accumulates the values in the feature maps 228, and the result is input into the second fully-connected 212 layer. The outputs of the second fully-connected 212 layer are the output predictions 214. FIG. 2 is an example configuration of a convolutional neural network. Other examples can include additional or fewer convolution operations, non-linearity operations, pooling operations, and/or fully-connected layers.

Non-linearity can be added after some convolution operations. Convolution is a linear operation, and in some examples, it is assumed that the real-world data being learned by the convolutional neural network is non-linear. Thus, a non-linear function can be applied, element-wise, to the output feature maps from a convolution. One such non-linear function is provided by a Rectified Linear Unit (ReLU), whose output is given by Output=Max (0, Input). Other non-linear functions may include tanh and sigmoid.

Pooling, which can also be referred to as sub-sampling or down-sampling, can reduce the dimensionality of a feature map while retaining the most important information. Pooling can include, for example, taking a region of values in the matrix of a feature map (e.g., a 2×2 neighborhood, or a neighborhood of another size), and determining a maximum value across the values in the region. Alternatively, average, sum, or another function can be used as the pooling function.

Pooling can be used to progressively reduce the spatial size of the input representation. For example, pooling can make the input representations (e.g., the feature dimension) smaller and more manageable. As another example, pooling can reduce the number of parameters and computations that need to be performed by the neural network. As another example, pooling can make the neural network invariant to small transformations, distortions, or translations in the input image. That is, a small distortion in the input is not likely to change the output of the pooling, since the maximum (or average, or sum, or some other operation) is taken in a local neighborhood. As a further example, pooling can assist in determining an almost scale invariant representation of the image (referred to as an equivariant representation). This means that an object can be detected in an image no matter where the object is located within the image.

As illustrated by the example of FIG. 2, a convolutional neural network can include multiple convolution layers, with each layer refining the features extracted by a previous layer. Each convolution layer may be, but need not be, followed by pooling. The output of a combination of these layers represent high-level features of the input image, such as the presence of certain shapes, colors, textures, gradients, and so on.

To turn these feature maps into a classification, a convolutional neural network can include one or more fully-connected layers. A Multi-Layer Perceptron that uses, for example, a softmax activation function or another logistic function, can be used after a fully-connected layer. A fully-connected layer can classify the input image into various classes based on training data. For example, the convolutional neural network of FIG. 2 was trained to recognize dogs, cats, boats, and birds, and can classify an input image as including one of these classes.

Apart from classification, a fully-connected layer in a convolutional neural network might also provide an inexpensive (in computational and/or data storage terms) way to learn non-linear combinations of the extracted features. The features extracted by the convolution and pooling layers may be good for making a classification, but combination of the features may be better.

In the example of FIG. 2, the sum of the output predictions 214 is 1, due to the output layer using the softmax activation function. The softmax function takes a vector of arbitrary real-valued scores and compresses these values into a vector of values between zero and one that add up to one.

Research has found that the more convolution steps a neural network has, the more features the network will be able to learn to recognize. For example, in an image classification example, in a first layer, the neural network may learn to detect edges from the raw pixels, then in a second layer use the edges to detect shapes, and in a third layer, the neural network may be able to use the shapes to determine higher-level features, such as facial shapes, in higher layers.

In the training of a convolutional neural network, parameters such as the number of filters, the filter sizes, and the organization of the layers remain unchanged. During training, only the values of the filter matrices and connection weights are changed. Once trained, a neural network includes the weights determined during the training and a set of instructions describing the computation to be executed at each layer and/or node of the network. In some examples, the number of weights can be on the order of 5 million to 100 million. In some examples, a weight value can be represented using a 32-bit number, in which case 5 million to 100 million weights can require about 20 megabytes (MB) to 400 MB to store. In some examples, the number of weights can be as few as 1.5 million.

Operation of a neural network (e.g., conducting inference) involves fetching input data or input activations, executing multiply-and-accumulate operations in parallel for each node in a layer, and providing output activations. Optimum performance of a neural network, measured by accuracy and/or response time, can be achieved when a hardware architecture is capable of highly parallelized computations. Central Processing Units (CPUs), which can also be referred to as general purposed processing units, can have multiple cores, (e.g., 2 to 64 or more cores) and can increase parallelism through use of multiple execution threads. CPU cores, however, tend to be optimized for sequential processing. For example, a computation engine (e.g., an arithmetic logic unit (ALU)) of a core obtains operands from memory and writes a result to memory, such that memory operations are required for sequential computations. In this example, each memory operation can require management by control logic of the CPU. For this and other reasons, CPUs tend to have slow response times when performing inference for a neural network.

In contrast to CPUs, Graphics Processing Units (GPUs) achieve parallelism by having thousands of small and efficient cores, configured specifically for conducting parallel computations. GPUs thus can achieve far better performance than a CPU when executing a neural network. Individual GPU computation engines, however, can still be primarily sequential in nature, such that memory operations are required for the outputs of one computation engine to be provided to the inputs of another.

Special-purpose acceleration engines can achieve better performance than both CPUs and GPUs when executing a neural network. Acceleration engines can employ a spatial architecture, in which computation engines form processing chains and can pass data directly from one computation engine to another. This can significantly reduce the number of memory transactions needed to conduct inference. In some examples, acceleration engines can also include an on-chip buffer that can store values read from processor memory, and that can distribute values to multiple computation engines in the acceleration engine. The computation engines can further include a small, local register file (e.g., a small memory) for storing intermediate results. Having an on-chip memory hierarchy can improve the efficiency of the operation of a neural network by reducing memory latencies.

Figures 3A, 3B:
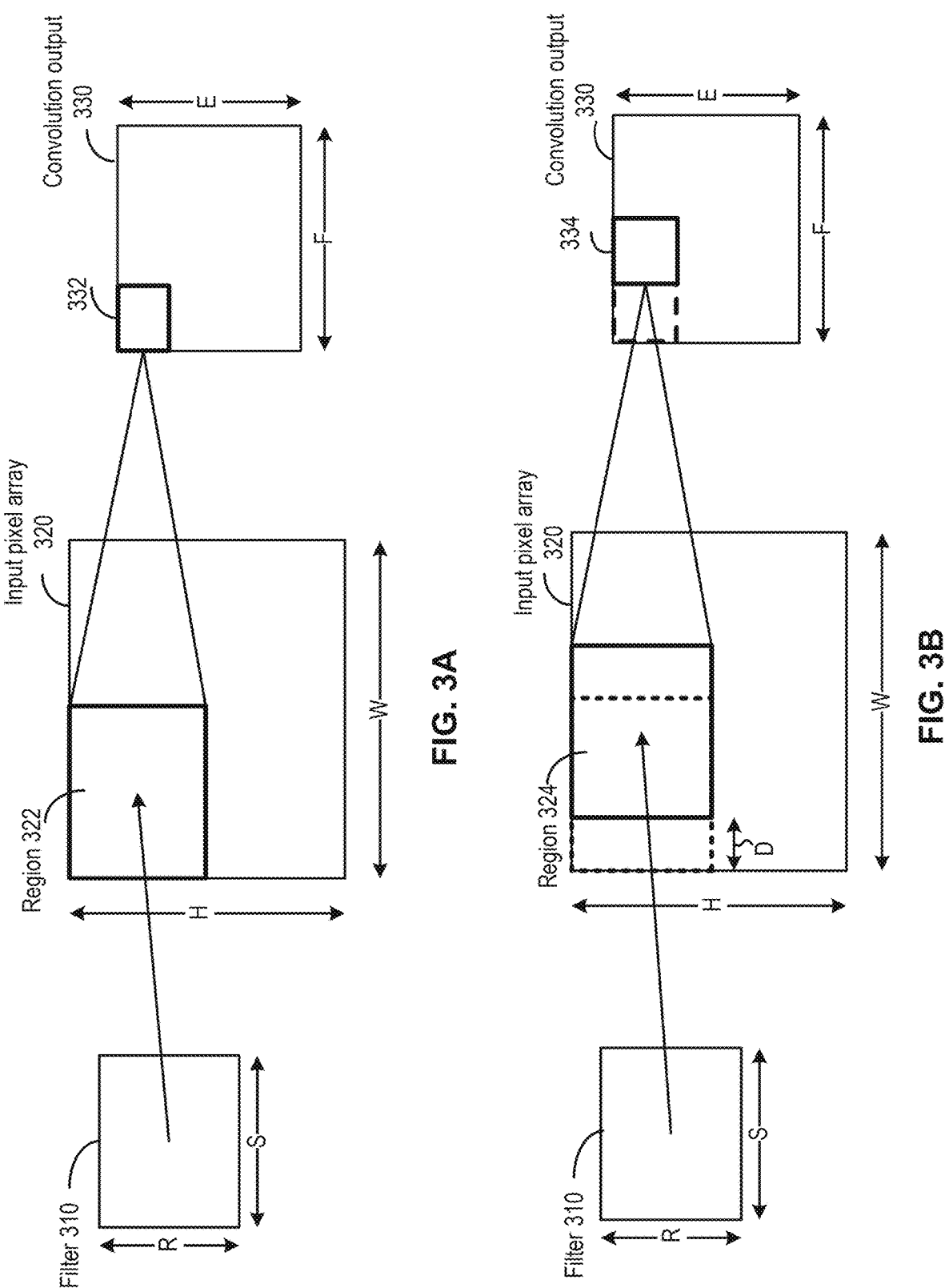
FIGS. 3A and 3B illustrate an example convolution operation performed on an input pixel array using a filter by a convolution layer in a convolutional neural network.

FIGS. 3A and 3B illustrate an example convolution operation performed on an input pixel array 320 using a filter 310 by a convolution layer in a convolutional neural network. The input pixel array 320 may include an input image, a channel of an input image, or a feature map generated by another convolution layer or pooling layer. FIG. 3A illustrates the convolution operation performed on a first region 322 of the input pixel array 320 at a first step. FIG. 3B illustrates the convolution operation performed on a second region 324 of the input pixel array 320 at a second step after sliding the filter 310 by a stride.

The filter 310 may include a two-dimensional matrix, each element of the matrix representing a weight. The weights in the filter 310 may be designed or trained to detect or extract certain features from the spatial distribution of pixel values in the image. The extracted features may or may not be meaningful to a human eye. Different filters may be used to detect or extract different features from the input pixel array. For example, some filters may be used to detect edges in an image, or to sharpen or blur an image. The filter 310 may have R rows (height) and S columns (width), and may typically be smaller than the input pixel array 320, which may have a height of H pixels and a width of W pixels. Each weight in the filter 310 may be mapped to a pixel in a region having R rows and S columns in the input pixel array 320. For example, as shown in FIG. 3A, a convolution layer (e.g., first convolution layer 215 or second convolution layer 235) or a processing node of the convolution layer may receive pixel values for a region 322 (including R×S pixels) of the input pixel array 320, perform element-wise multiplications between corresponding elements in the filter 310 and the region 322, and sum the products of the element-wise multiplications to generate a convolution output value 332. In other words, the convolution output value 332 may be the sum of multiplication results between weights in the filter 310 and corresponding pixels in the region 322 according to $$\sum_{i=0}^{n} x_i w_i,$$

that is, a dot-product between a matrix representing the filter 310 and a matrix representing pixel values of the region 322.

Similarly, as shown in FIG. 3B, the convolution layer (e.g., another processing node of the convolution layer) may receive pixel values for a region 324 (including R×S pixels) of the input pixel array 320, perform element-wise multiplications between corresponding elements in the filter 310 and the region 324, and sum the products of the element-wise multiplications to generate a convolution output value 334. As shown in FIG. 3B, the convolution operations can be performed in a sliding-window fashion in a pre-determined stride D. For example, in the example shown in FIG. 3B, the region 324 may be at a distance D (in terms of pixels) from the region 322, and the next region for the next convolution operation may be situated at the same distance D from the region 324. The stride D may be smaller or greater than the width S of the filter 310.

The outputs of the convolution operations may form a convolution output matrix 330 with a height of E rows and a width of F columns. As described above, the matrix 330 may be referred to as a feature map. The dimensions of the matrix 330 may be smaller than the input pixel array 320 and may be determined based on the dimensions of the input pixel array 320, dimensions of the filter 310, and the stride D. For example, if the stride D is equal to one pixel in both horizontal and vertical directions, E may be equal to H−R+1, and F may be equal to W−S+1. In some implementations, each convolution output (e.g., output values 332 or 334) in FIGS. 3A and 3B may correspond to the output of a processing node of the convolution layer.

The convolution using one filter over an input pixel array may be used to produce one feature map, and the convolution using another filter over the same input pixel array may generate a different feature map. In practice, a CNN may learn the weights of the filters on its own during the training process based on some user specified parameters (which may be referred to as hyperparameters) before the training process, such as the number of filters, the filter size, the architecture of the network, etc. The more number of filters used, the more image features may get extracted, and the better the network may be at recognizing patterns in new images.

As described above, the sizes of the output feature maps may be determined based on parameters, such as the depth, stride, and zero-padding. In the convolutional neural network 200 shown in FIG. 2, three distinct filters are used in the first convolution 202 to perform convolution operations on the input image, thus producing three different output matrices (or feature maps) 222. Stride is the number of pixels by which the filter matrix is slid over the input pixel array. For example, when the stride is 1, the filter matrix is moved by one pixel at a time. When the stride is 2, the filter matrix is moved by 2 pixels at a time. Having a larger stride may produce smaller feature maps. In some implementations, the input matrix may be padded with zeros around the border so that the filter matrix may be applied to bordering elements of the input pixel array. Zero-padding may allow the control of the size of the feature maps. For example, zero-padding can increase the size of the output matrix and allow the input and output matrices to have similar dimensions. Spatial pooling (also referred to as subsampling or down-sampling) may reduce the dimensions of each feature map, while retaining the most important information.

Figures 4A, 4B, 4C, 4D, 4E:
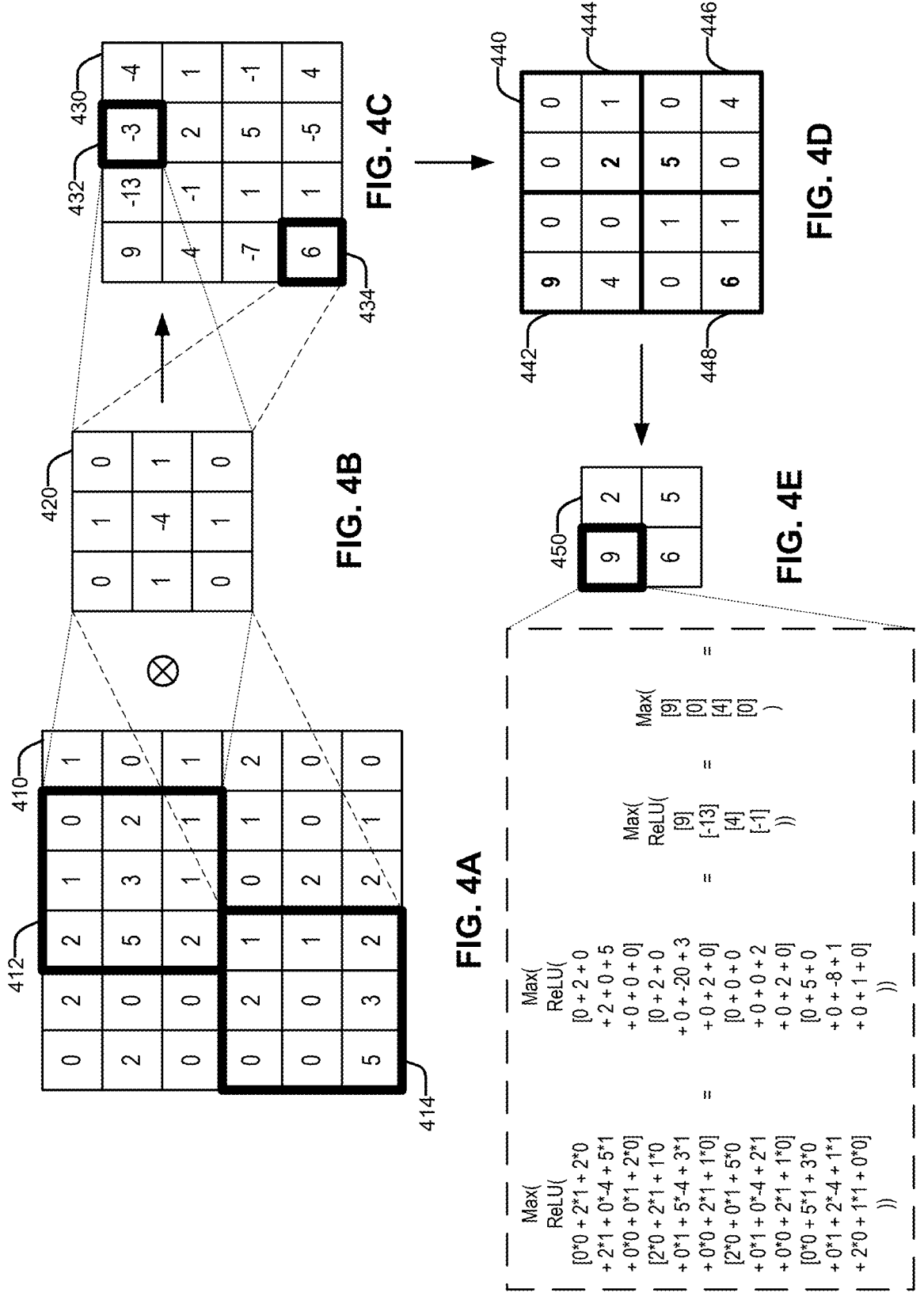
FIGS. 4A-4E illustrate example convolution, non-linear activation, and pooling operations performed on example input pixel data.

FIGS. 4A-4E illustrate example convolution, non-linear activation, and pooling operations performed on example input pixel data. The input pixel data may represent, for example, a digital image, a channel of a digital image, or a feature map generated by a previous layer in a convolutional neural network. FIG. 4A illustrates an example input matrix 410 that includes the example input pixel data. Input matrix 410 may include a 6×6 pixel array, where each element of the pixel array may include a real number, such as an integer number or a floating point number. FIG. 4B illustrates an example filter 420. Filter 420 may include a 3×3 matrix, where each element of the matrix represents a weight of the filter. Filter 420 may be used to extract certain features from input matrix 410. For example, the example filter 420 shown in FIG. 4B may be a filter for detecting edges in an image.

Input matrix 410 and filter 420 may be convolved to generate an output matrix 430 as shown in FIG. 4C. Each element in output matrix 430 may be the sum of element-wise multiplications (e.g., dot-product) between corresponding elements in filter 420 and an overlapping region 412 of input matrix 410 and may be determined in each step a window having the same dimensions as filter 420 (e.g., 3×3) slides over input matrix 410 with a certain stride (e.g., 1 element horizontally and/or vertically). For example, the value of element 432 in row 1 and column 3 of output matrix 430 may be the dot-product between the matrix representing filter 420 and a matrix representing region 412 of input matrix 410, where $2\times0+1\times1+0\times0+5\times1+3\times(-4)+2\times1+2\times0+1\times1+1\times0=1+5-12+2+1=-3$. Similarly, the value of element 434 in row 4 and column 1 of output matrix 430 may be the dot-product between the matrix representing filter 420 and a matrix representing region 414 of input matrix 410, where $0\times0+2\times1+1\times0+0\times1+0\times(-4)+1\times1+5\times0+3\times1+2\times0=2+1+3=6$. For input matrix 410 with a 6×6 pixel array and filter 420 represented by a 3×3 matrix, output matrix 430 may be a 4×4 matrix when the stride used is one element or pixel.

A non-linear activation function (e.g., ReLU, sigmoid, tanh, etc.) may then be applied to output matrix 430 to generate a matrix 440 as shown in FIG. 4D. In the example shown in FIG. 4D, the ReLU function is used, and thus all negative values in output matrix 430 are replaced by 0s in matrix 440. A pooling operation (e.g., a max, average, or sum pooling operation) may be applied to matrix 440 to sub-sample or down-sample data in matrix 440. In the example shown in FIGS. 4D and 4E, a max pooling operation may be applied to matrix 440, where the 4×4 matrix 440 may be divided into four 2×2 regions 442, 444, 446, and 448. The maximum value of each region may be selected as a subsample representing each region. For example, a maximum value of 9 is selected from region 442, a maximum value of 2 is selected from region 444, a maximum value of 5 is selected from region 446, and a maximum value of 6 is selected from region 448. Thus, a feature map 450 with four elements 9, 2, 6, and 5 may be generated from the 6×6 input matrix 410 after the convolution, non-linear activation, and pooling operations.

Figure 5:
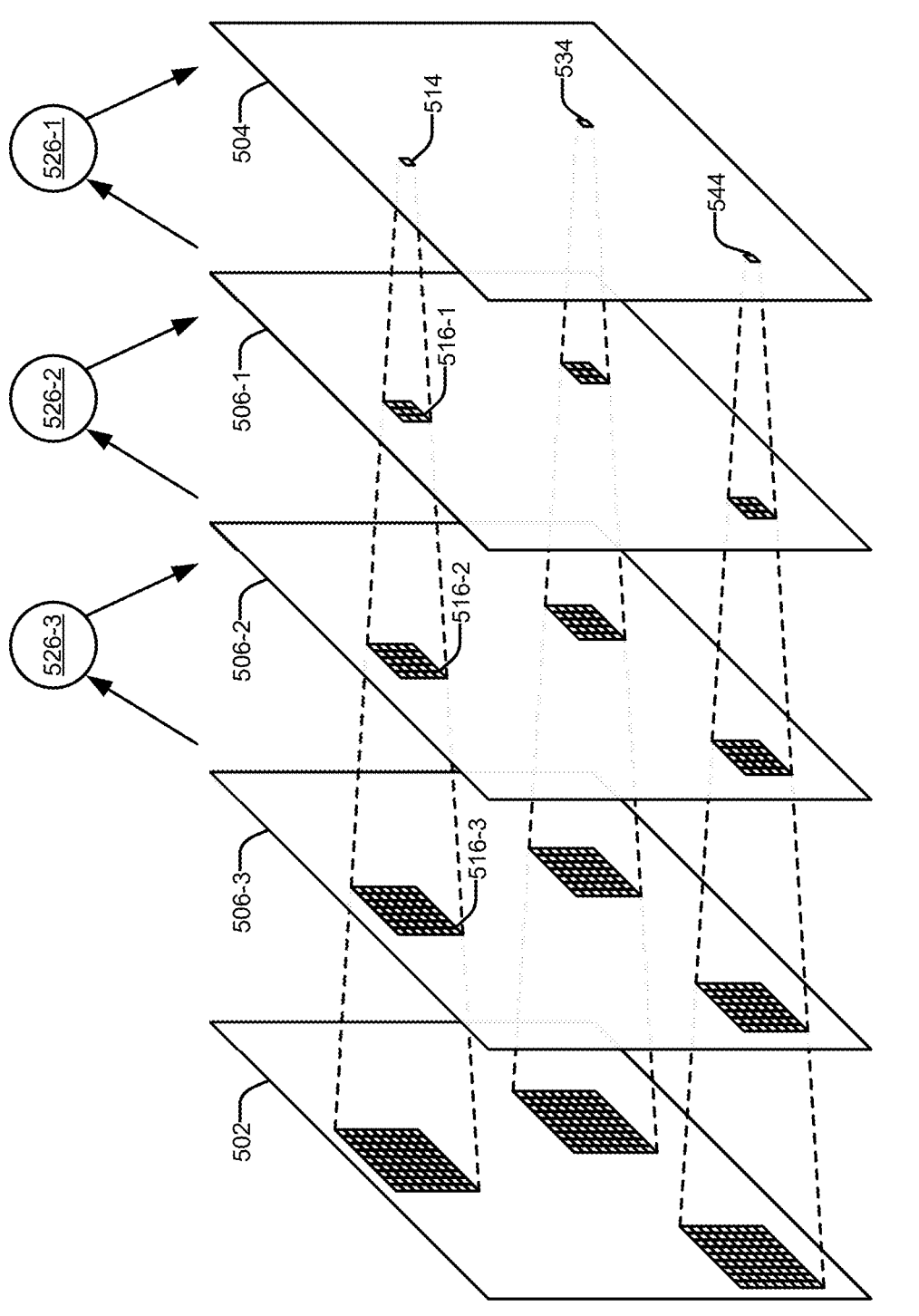
FIG. 5 illustrates various example steps for debugging a neural network execution through operation backtracking.

FIG. 5 illustrates various example steps for debugging a neural network execution through operation backtracking. The operations of the neural network may be executed using a systolic array and using an input map 502 (e.g., input feature map) as input to the neural network. The neural network may include a plurality of operations 526 that are sequentially performed on the input map 502 to generate an output map 504 (e.g., output feature map). The output map 504 may include a plurality of output values.

In some examples, one or more of the plurality of output values are selected, such as output value 514. The output value 514 may be automatically selected by a debugger program or manually selected by a user operating the debugger program. For example, the output value 514 may be erroneous and the user may wish to debug the neural network execution to detect one or more computation errors causing the erroneous output value 514. In some examples, a reference output map having a plurality of reference output values is generated using a reference processor (e.g., a CPU or GPU). Erroneous output values of the output map 504 may be detected by comparing the output values to corresponding reference output values. For example, it may be determined whether a difference between an output value and a reference value exceeds an accuracy threshold. In the illustrated example, it may be determined that each of the output values 514, 534, 544 differ from their corresponding reference output values by more than an accuracy threshold.

After the output value 514 is selected, the debugger program may identify a first set of operations 526-1 that relate a first intermediary map 506-1 to the output map 504. The first set of operations 526-1 may correspond to a single node, multiple nodes, a single layer, and/or multiple layers of the neural network. Based on the first set of operations 526-1 and on the output value 514, the debugger program may identify a first set of contributing values 516-1 of the first intermediary map 506-1. The first set of contributing values 516-1 may include each and every value of the first intermediary map 506-1 that is involved in the computation of the output value 514 when the first set of operations 526-1 are performed on the first intermediary map 506-1 and/or the first set of contributing values 516-1.

Backtracking from the output map 504 to the first intermediary map 506-1 may involve reversing each of the first set of operations 526-1 while (optionally) ignoring specific numerical calculations. For example, if the first set of operations 526-1 includes a convolution operation, a reverse convolution may be performed without specific numerical calculations by tracing backward starting at the output value 514 to determine which values of the first intermediary map 506-1 were involved in the computation of the output value 514. In the illustrated example, the first set of contributing values 516-1 include 9 values, each and every one of which is used to compute the output value 514. In some examples, the first set of contributing values 516-1 may correspond to multiple channels.

Upon identifying the first set of contributing values 516-1, the debugger program may identify a second set of operations 526-2 that relate a second intermediary map 506-2 to the first intermediary map 506-1. The second set of operations 526-2 may correspond to a single node, multiple nodes, a single layer, and/or multiple layers of the neural network. Based on the second set of operations 526-2 and on the first set of contributing values 516-1, the debugger program may identify a second set of contributing values 516-2 of the second intermediary map 506-2. The second set of contributing values 516-2 may include each and every value of the second intermediary map 506-2 that is involved in the computation of the first set of contributing values 516-1 when the second set of operations 526-2 are performed on the second intermediary map 506-2 and/or the second set of contributing values 516-2.

Backtracking from the first intermediary map 506-1 to the second intermediary map 506-2 may involve reversing each of the second set of operations 526-2 while (optionally) ignoring specific numerical calculations. For example, if the second set of operations 526-2 includes a convolution operation, a reverse convolution may be performed without specific numerical calculations by tracing backward starting at the first set of contributing values 516-1 to determine which values of the second intermediary map 506-2 were involved in the computation of the first set of contributing values 516-1. In the illustrated example, the second set of contributing values 516-2 include 25 values, each and every one of which is used to compute the first set of contributing values 516-1.

Upon identifying the second set of contributing values 516-2, the debugger program may identify a third set of operations 526-3 that relate a third intermediary map 506-3 to the second intermediary map 506-2. The third set of operations 526-3 may correspond to a single node, multiple nodes, a single layer, and/or multiple layers of the neural network. Based on the third set of operations 526-3 and on the second set of contributing values 516-2, the debugger program may identify a third set of contributing values 516-3 of the third intermediary map 506-3. The third set of contributing values 516-3 may include each and every value of the third intermediary map 506-3 that is involved in the computation of the second set of contributing values 516-2 when the third set of operations 526-3 are performed on the third intermediary map 506-3 and/or the third set of contributing values 516-3.

Backtracking from the second intermediary map 506-2 to the third intermediary map 506-3 may involve reversing each of the third set of operations 526-3 while (optionally) ignoring specific numerical calculations. For example, if the third set of operations 526-3 includes a convolution operation, a reverse convolution may be performed without specific numerical calculations by tracing backward starting at the second set of contributing values 516-2 to determine which values of the third intermediary map 506-3 were involved in the computation of the second set of contributing values 516-2. In the illustrated example, the third set of contributing values 516-3 include 49 values, each and every one of which is used to compute the second set of contributing values 516-2.

The above-described techniques can be used to identify additional sets of contributing values of additional intermediary maps until a computation error is detected. In some examples, upon identifying a set of contributing values, at least a portion of the plurality of operations of the neural network may be executed to generate the identified set of contributing values. This may be accomplished by setting a breakpoint within the neural network at the proper instruction (e.g., immediately prior to or after a particular node or layer) such that the generated set of contributing values may be accessed. Alternatively or additionally, the debugger program may cause the generated set of contributing values to be written to memory such that the debugger program may access the values.

In some examples, the generated set of contributing values may be compared to a set of reference contributing values to detect the computation error and/or to determine a cause of the computation error. For example, after identifying and generating the first set of contributing values 516-1, the first set of contributing values 516-1 may be compared to a first set of reference contributing values. If the computation error can be detected based on the comparison, the debugger program may refrain from further operation backtracking and may then determine the cause of the computation error. For example, if the first set of contributing values 516-1 do not differ from the first set of reference contributing values, then the computation error has been detected (e.g., the computation error occurring during the first set of operations 526-1) and the cause of the computation error can be determined (e.g., a precision-based summation error occurring during the first set of operations 526-1 and/or a defective element of the systolic array involved in computing the output value 514 from the first set of contributing values 516-1).

If the computation error cannot be detected based on the comparison between the first set of contributing values 516-1 and the first set of reference contributing values (e.g., one or more of the first set of contributing values 516-1 differ from the first set of reference contributing values), the debugger program may backtrack further through the plurality of operations. For example, after identifying and generating the second set of contributing values 516-2, the second set of contributing values 516-2 may be compared to a second set of reference contributing values. If the computation error can be detected based on the comparison, the debugger program may refrain from further operation backtracking and may then determine the cause of the computation error. For example, if the second set of contributing values 516-2 do not differ from the second set of reference contributing values, then the computation error has been detected (e.g., the computation error occurring during the second set of operations 526-2) and the cause of the computation error can be determined (e.g., a precision-based summation error occurring during the second set of operations 526-2 and/or a defective element of the systolic array involved in computing the first set of contributing values 516-1 from the second set of contributing values 516-2).

If the computation error cannot be detected based on the comparison between the second set of contributing values 516-2 and the second set of reference contributing values (e.g., one or more of the second set of contributing values 516-2 differ from the second set of reference contributing values), the debugger program may backtrack further through the plurality of operations. For example, after identifying and generating the third set of contributing values 516-3, the third set of contributing values 516-3 may be compared to a third set of reference contributing values. If the computation error can be detected based on the comparison, the debugger program may refrain from further operation backtracking and may then determine the cause of the computation error. For example, if the third set of contributing values 516-3 do not differ from the third set of reference contributing values, then the computation error has been detected (e.g., the computation error occurring during the third set of operations 526-3) and the cause of the computation error can be determined (e.g., a precision-based summation error occurring during the third set of operations 526-3 and/or a defective element of the systolic array involved in computing the second set of contributing values 516-2 from the third set of contributing values 516-3).

In some examples, the debugger program may suspect that the cause of the computation error is that a particular processing element of the systolic array is defective. In such examples, the debugger program may additionally perform the above-described techniques on the output values 534, 544 to determine whether the same processing element is determined to be the cause of the computation error for those output values. In some examples, different sets of processing elements of the systolic array may be identified for different output values. For example, the output value 514 may identify a first set of processing elements of the systolic array as containing a defective processing element, the output value 534 may identify a second set of processing elements of the systolic array as containing a defective processing element, and the output value 544 may identify a third set of processing elements of the systolic array as containing a defective processing element. The three sets of processing elements can be compared to find a common processing element and thereby find the defective processing element.

Figures 6A, 6B:
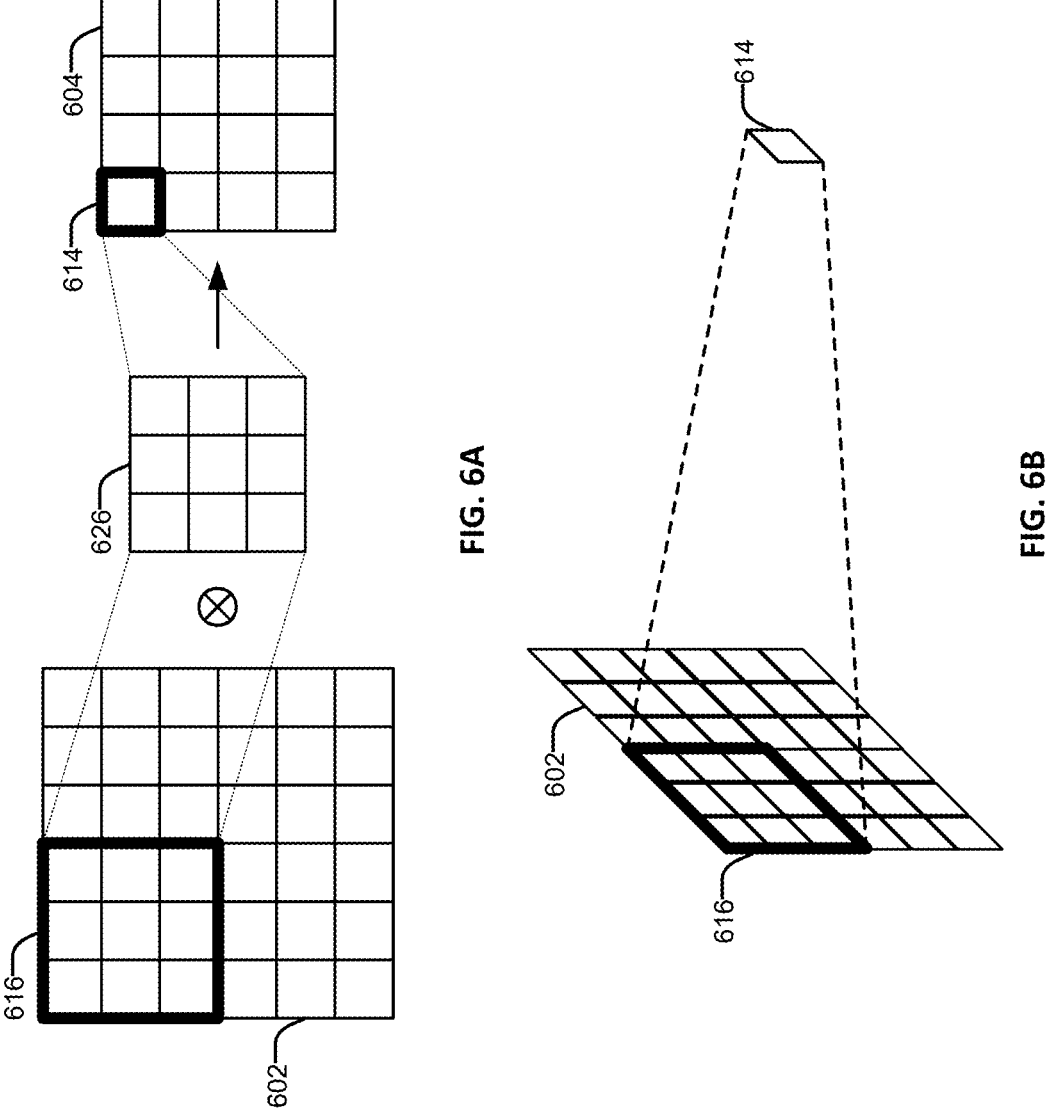
FIGS. 6A and 6B illustrate an example of operation backtracking for a convolution operation performed on an intermediary map to generate an output map.

FIGS. 6A and 6B illustrate an example of operation backtracking for a convolution operation performed on an intermediary map 602 to generate an output map 604. The convolution operation is performed by convolving the intermediary map 602 with a filter 626. The intermediary map 602 includes a 6×6 pixel array and the filter 626 includes a 3×3 pixel array, where each element of the pixel arrays may include a real number, such as an integer number or a floating point number.

To backtrack the operation, first, an output value 614 of the output map 604 is selected. Next, the convolution operation is reversed for the output value 614 by tracing backward from the output value 614 to determine which values of the intermediary map 602 were involved in the computation of the output value 614. Because the output value 614 is in the top left of the output map 604 and the filter 626 has dimensions of 3×3, the contributing values 616 of the intermediary map 602 are the 3×3 set of values in the top left of the intermediary map 602.

Figures 7A, 7B:
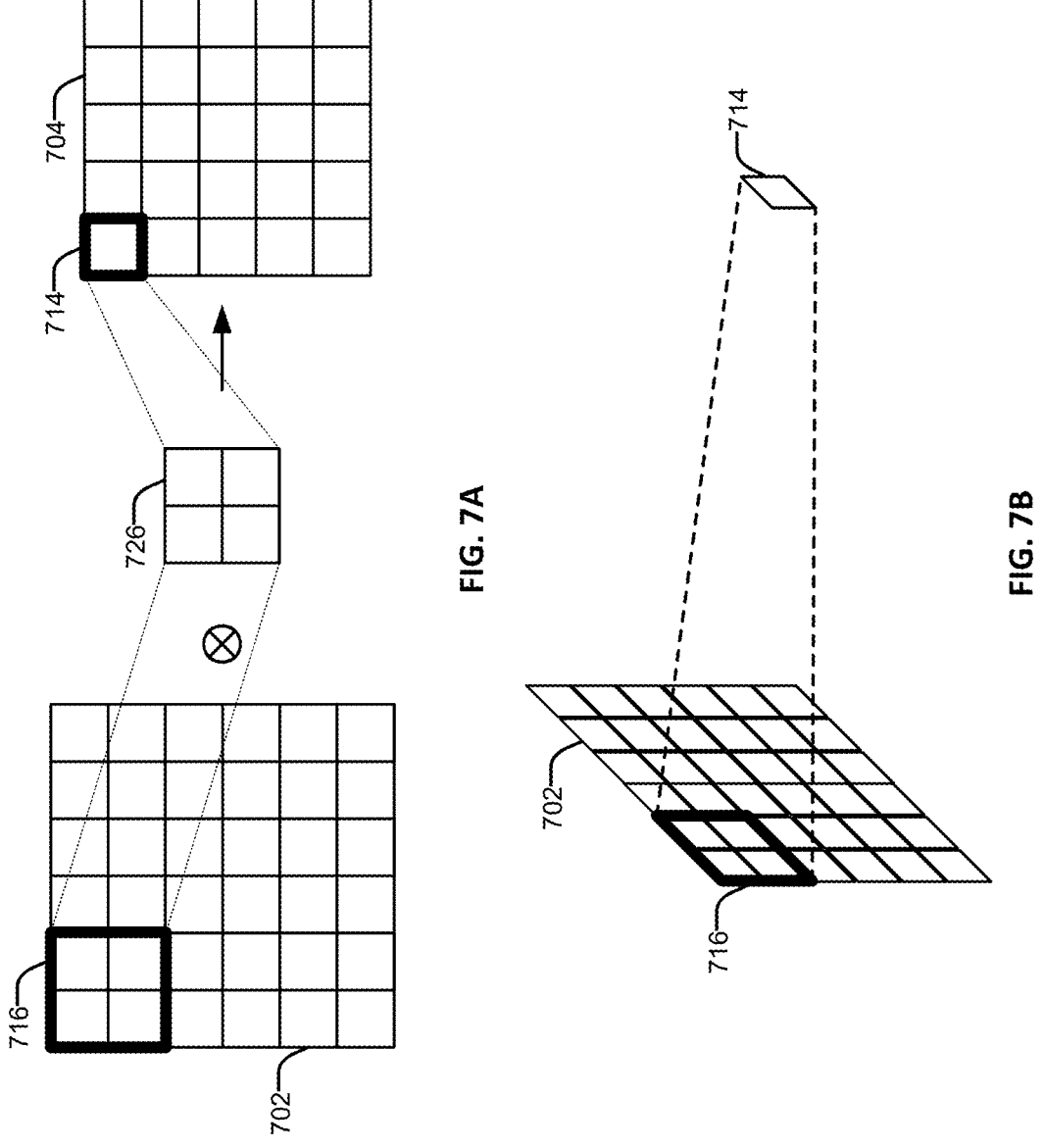
FIGS. 7A and 7B illustrate an example of operation backtracking for a convolution operation performed on an intermediary map to generate an output map.

FIGS. 7A and 7B illustrate an example of operation backtracking for a convolution operation performed on an intermediary map 702 to generate an output map 704. The convolution operation is performed by convolving the intermediary map 702 with a filter 726. The intermediary map 702 includes a 6×6 pixel array and the filter 726 includes a 2×2 pixel array, where each element of the pixel arrays may include a real number, such as an integer number or a floating point number.

To backtrack the operation, after an output value 714 of the output map 704 is selected, the convolution operation is reversed by tracing backward from the output value 714 to determine which values of the intermediary map 702 were involved in the computation of the output value 714. Because the output value 714 is in the top left of the output map 704 and the filter 726 has dimensions of 2×2, the contributing values 716 of the intermediary map 702 are the 2×2 set of values in the top left of the intermediary map 702.

Figure 8A:
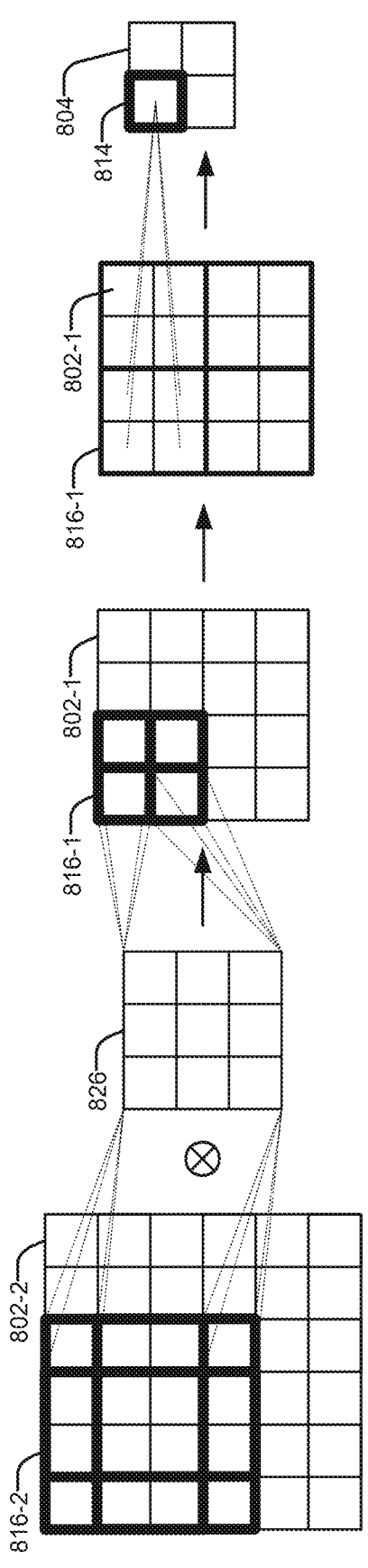
FIGS. 8A and 8B illustrate an example of operation backtracking for a convolution operation and a max pooling operation, which are sequentially performed on a second intermediary map to generate an output map.
Figure 8B:
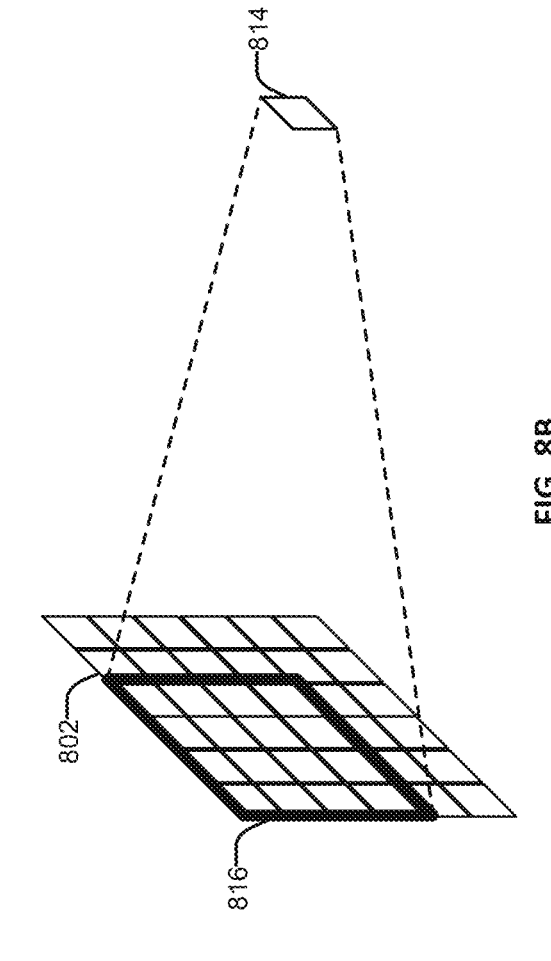

FIGS. 8A and 8B illustrate an example of operation backtracking for a convolution operation and a pooling operation, which are sequentially performed on a second intermediary map 802-2 to generate an output map 804. The convolution operation is performed by convolving the second intermediary map 802-2 with a filter 826 to generate a first intermediary map 802-1. The second intermediary map 802-2 includes a 6×6 pixel array and the filter 826 includes a 3×3 pixel array. The pooling operation is performed by dividing the first intermediary map 802-1 into four regions of 2×2 pixel arrays and creating the output map 804 to have the maximum/minimum/average value in each of the four regions.

To backtrack the operation, after an output value 814 of the output map 804 is selected, the pooling operation is reversed for the output value 814 by tracing backward from the output value 814 to the region of the first intermediary map 802-1 to determine the first contributing values 816-1 from which the maximum/minimum/average was determined. Next, the convolution operation is reversed for the first contributing values 816-1 by tracing backward from each of the first contributing values 816-1 to determine the contributing values 816-2 of the second intermediary map 802-2 that were involved in the computation of any of the first contributing values 816-1.

Figure 9:
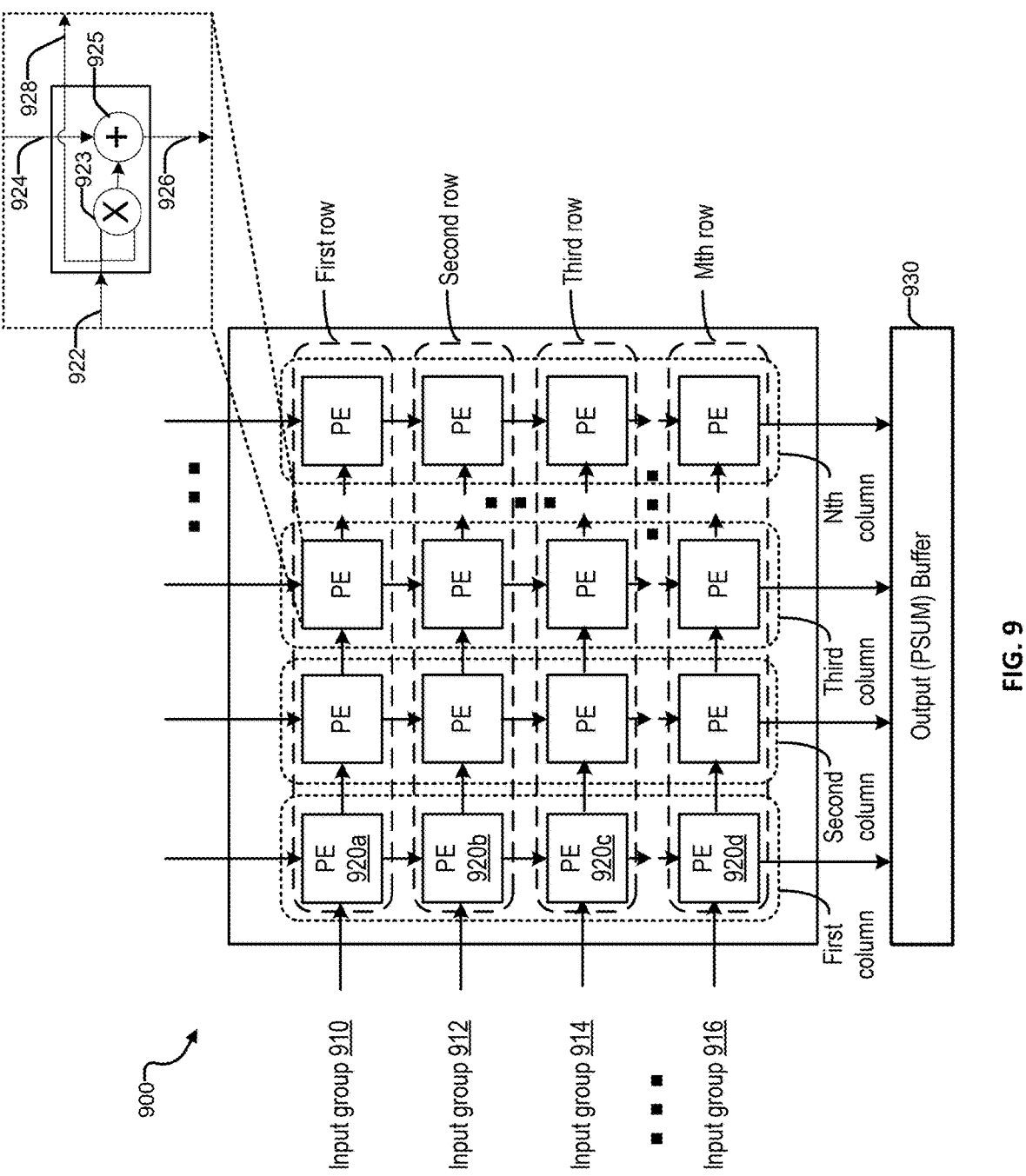
FIG. 9 illustrates a simplified example computing engine including an array of processing elements, which may comprise a systolic array.

FIG. 9 illustrates a simplified example computing engine 900 including an array of processing elements 920, which may comprise a systolic array as described herein. In the example shown in FIG. 9, the computing engine 900 may include an M×N array of processing elements with N processing elements in each of M rows and M processing elements in each of N columns. Each processing element may include a row input bus 922, a column input bus 924, a column output bus 926, and a row output bus 928. A processing element may receive inputs from a preceding processing element (on the left) in the same row (or from external circuitry) via row input bus 922. The processing element may also receive inputs from a preceding processing element (on top) in the same column (or from external circuitry) via column input bus 924. The inputs may be floating point values. The processing element may perform floating point arithmetic operations (e.g., multiply and accumulate (MAC)) based on the inputs, and transmit the result of the arithmetic operations to a subsequent (lower) processing element in the same column (or to external circuitry) via column output bus 926. The processing element may also forward the inputs to a subsequent processing element (to the right) in the same row, via row output bus 928.

Each row of the computing engine 900 may process one input data set comprising multiple input data elements, whereas each column of the computing engine 900 may generate a weighted sum of input data elements from different input data sets. For example, when the computing engine 900 is to process M input input groups 910, 912, 914, . . . , and 916, a first row may receive input data elements of input group 910, a second row may receive input data elements of input group 912, a third row may receive input data elements of input group 914, . . . , and an Mth row may receive input data elements of input group 916. Each processing element may include a multiplier 923 that would handle one input data element at a time. For example, the processing element may receive an input data element and a weight (e.g., from row input bus 922) and generate, using the multiplier 923, a multiplication product to represent a weighted input data element. The weight may be an element of a convolution kernel (i.e., filter) or a weight of a connection between nodes on two layers of a fully-connected layer. In addition, the processing element may also receive a partial weighted sum from the preceding processing element in the same column (e.g., from column input bus 924). The partial weighted sum represents the weighted sum of input data elements of input data sets received by processing elements on rows above the processing element. The processing element may include an adder 925 that may add the weighted input data element to the partial weighted sum, and pass the updated partial weighted sum to the processing element below in the same column (e.g., through column output bus 926). The processing element at the bottom row of each column may generate a weighted sum of input data elements received by all processing elements in the column.

The operations of each processing element of the computing engine 900 may be synchronized to a clock signal to improve the interoperability between the computing engine 900 and other components of a neural network processor. Each processing element may also include sequential logic circuitries (e.g., registers, latches, flip-flops, state machines, etc.) to store input data, weights, and output data for the adder and multiplier circuitry, and to synchronize the flow of the data into and out of the circuitry. The sequential logic circuitry of each processing element can be clocked by either the same clock signal or a replica of the clock signal, such that data may be synchronously shifted into and/or out of the processing element sequentially during the clock cycles. For example, in a first clock cycle, a processing element 920*b* of the second row may receive a first input data element of input group 912 as well as a partial sum comprising weighted first input data element of input group 910 from processing element 920*a* of the first row. Within the first clock cycle, a processing element 920*b* may multiply the input data element with a weight, add the multiplication product to the partial sum to generate an updated partial sum, and store the updated partial sum in an internal register. In the second clock cycle, processing element 920*b* may forward the updated partial sum to a processing element 920*c* on the third row below, which may perform the multiplication and accumulation to generate an updated partial sum. In the third clock cycle, processing element 620*c* may forward the updated partial sum to a next processing element on the fourth row below, which may perform the multiplication and accumulation to generate an updated partial sum. The updated partial sum may be propagated down along each column until it is output by processing element 920*d* on the Mth row at the Mth clock cycle to an output buffer 930 (also referred to as a PSUM buffer).

In some implementations, each column of the computing engine 900 may correspond to a processing node of a neural network layer, and may apply a different set of weights {w,} to generate a different weighted sum $$y = \sum_{i=0}^{n} x_i w_i$$

for each input dataset {$x_i$}.

Figure 10:
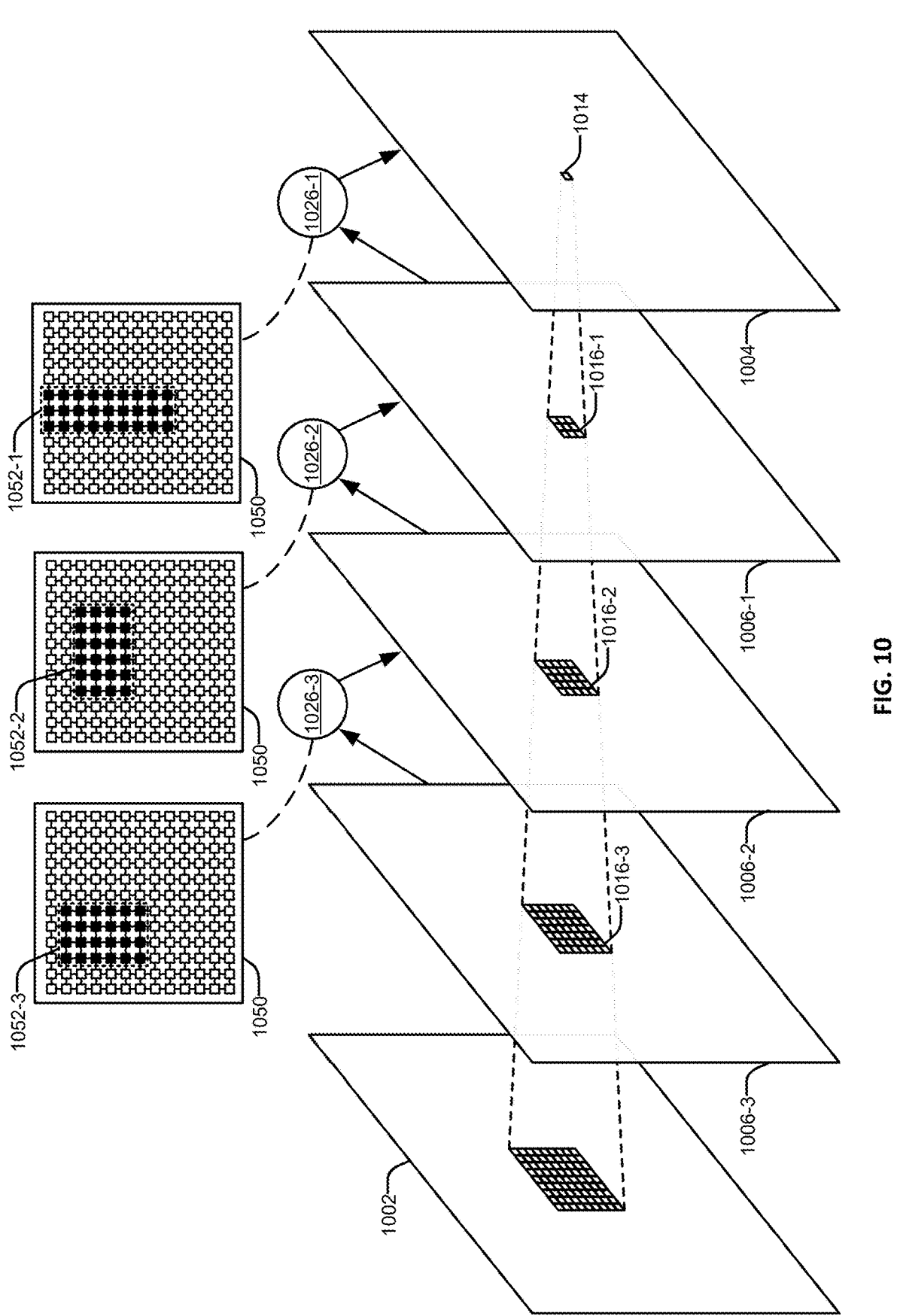
FIG. 10 illustrates various example steps for debugging a neural network execution through operation backtracking.

FIG. 10 illustrates various example steps for debugging a neural network execution through operation backtracking. Specifically, FIG. 10 is directed to identifying contributing processing elements 1052 of a systolic array 1050. The neural network may include a plurality of operations 1026 that are executed using the systolic array 1050 using an input map 1002 (e.g., input feature map) to generate an output map 1004 (e.g., output feature map).

After identifying a first set of operations 1026-1 that relate a first intermediary map 1006-1 to the output map 1004, and after identifying a first set of contributing values 1016-1 of the first intermediary map 1006-1 that are involved in the computation of an output value 1014 of the output map 1004, the debugger program may identify a first set of contributing processing elements 1052-1 of the systolic array 1050 that are directly used in the first set of operations 1026-1 to compute the output value 1014 from the first set of contributing values 1016-1. The first set of contributing processing elements 1052-1 may be identified based on the locations of the first set of contributing values 1016-1 within the first intermediary map 1006-1 (e.g., rows or columns of the values) and/or the architecture of the systolic array 1050. The first set of contributing processing elements 1052-1 may include a subset of the total number of processing elements of the systolic array 1050.

Similarly, after identifying a second set of operations 1026-2 that relate a second intermediary map 1006-2 to the first intermediary map 1006-1, and after identifying a second set of contributing values 1016-2 of the second intermediary map 1006-2 that are involved in the computation of the first set of contributing values 1016-1 of the first intermediary map 1006-1, the debugger program may identify a second set of contributing processing elements 1052-2 of the systolic array 1050 that are directly used in the second set of operations 1026-2 to compute the first set of contributing values 1016-1 from the second set of contributing values 1016-2. The second set of contributing processing elements 1052-2 may be identified based on the locations of the second set of contributing values 1016-2 within the second intermediary map 1006-2 (e.g., rows or columns of the values) and/or the architecture of the systolic array 1050. The second set of contributing processing elements 1052-2 may include a subset of the total number of processing elements of the systolic array 1050. The second set of contributing processing elements 1052-2 may include one or more processing elements in common with the first set of contributing processing elements 1052-1.

Similarly, after identifying a third set of operations 1026-3 that relate a third intermediary map 1006-3 to the second intermediary map 1006-2, and after identifying a third set of contributing values 1016-3 of the third intermediary map 1006-3 that are involved in the computation of the second set of contributing values 1016-2 of the second intermediary map 1006-2, the debugger program may identify a third set of contributing processing elements 1052-3 of the systolic array 1050 that are directly used in the third set of operations 1026-3 to compute the second set of contributing values 1016-2 from the third set of contributing values 1016-3. The third set of contributing processing elements 1052-3 may be identified based on the locations of the third set of contrib- uting values 1016-3 within the third intermediary map 1006-3 (e.g., rows or columns of the values) and/or the architecture of the systolic array 1050. The third set of contributing processing elements 1052-3 may include a subset of the total number of processing elements of the systolic array 1050. The third set of contributing processing elements 1052-3 may include one or more processing ele- ments in common with the second set of contributing processing elements 1052-2 and the first set of contributing processing elements 1052-1.

Figure 11:
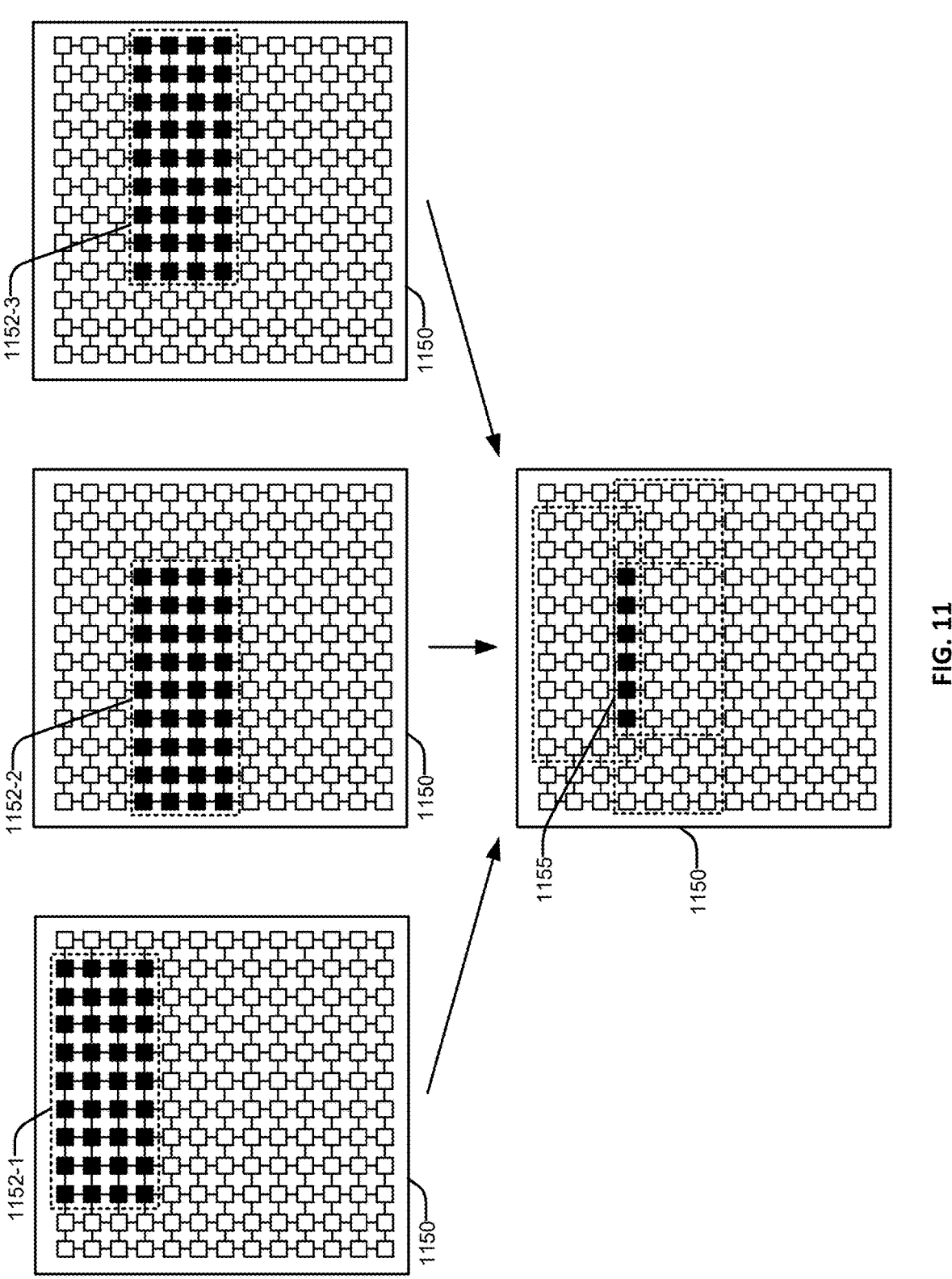
FIG. 11 illustrates various example steps for identifying defective processing elements of a systolic array during debugging of a neural network execution through operation backtracking.

FIG. 11 illustrates various example steps for identifying defective processing elements of a systolic array 1150 during debugging of a neural network execution through operation backtracking. As described herein, a first set of contributing processing elements 1152-1 can be identified as being used in the computation of a first erroneous output value, a second set of contributing processing elements 1152-2 can be identified as being used in the computation of a second erroneous output value, and a third set of contrib- uting processing elements 1152-3 can be identified as being used in the computation of a third erroneous output value. The three sets of processing elements can be compared to find one or more processing elements 1155 that are common to each of the three sets. In the illustrated example, 6 common processing elements 1155 are identified by the debugger program. In some examples, the debugger pro- gram can compute a score for each processing element of the systolic array 1150 based on the number of times the processing element is included in one of the sets of contrib- uting processing elements 1152. Processing elements with higher scores may be identified as being more likely to be defective than processing elements with lower scores.

FIG. 12 illustrates an example method 1200 for debug- ging an execution of a neural network through operation backtracking. Steps of the method 1200 need not be per- formed in the order shown, and one or more steps of the method 1200 may be omitted during performance of the method 1200.

At step 1202, a plurality of operations of a neural network are executed using an array of processing elements (e.g., a systolic array) of an integrated circuit device to generate an output map. The output map may include a plurality of output values. The output map may include a plurality of channels, and each of the plurality of output values may be associated with one of the plurality of channels. The plu- rality of operations may be executed using the systolic array based on an input map. In some examples, step 1202 is initialized and/or facilitated by a debugger program.

At step 1204, the plurality of operations are executed using a reference processor to generate a reference output map. The plurality of operations may be executed using the reference processor based on an input map. The reference processor may be a CPU, a GPU, among other possibilities. In some examples, the reference output map may be gen- erated by modeling or simulating the plurality of operations using the reference processor. In some examples, step 1204 is initialized and/or facilitated by the debugger program.

At step 1206, an output value of the plurality of output values is selected. The output value may be automatically selected by the debugger program or manually selected by a user operating the debugger program. For example, the debugger program may compare the plurality of output values to the plurality of reference output values to deter- mine whether any output value differs from any reference output value by more than an accuracy threshold. The accuracy threshold may be 1%, 2%, 5%, 10%, or the like. Alternatively or additionally, a user operating the debugger program may manually select the output value based on a recommendation from the debugger program and/or a visual inspection of the output map and the reference output map. The output value may be associated with one of the plurality of channels.

Steps 1208 through 1216 constitute a loop that may be performed over multiple iterations. The number of iterations may be determined by whether an exit condition is satisfied during step 1216.

At step 1208, during a first iteration (e.g., i=1), the debugger program identifies a first set of operations of the plurality of operations that relate a first intermediary map to the output map. During a second iteration (e.g., i=2), the debugger program identifies a second set of operations of the plurality of operations that relate a second intermediary map to the first intermediary map.

At step 1210, during the first iteration, the debugger program identifies a first set of contributing values of the first intermediary map that contribute to the output value. During the second iteration, the debugger program identifies a second set of contributing values of the second interme- diary map that contribute to the first set of contributing values.

At step 1212, during the first iteration, the debugger program causes at least a portion of the plurality of opera- tions to be executed, using the systolic array, to generate the first set of contributing values. In some examples, all of the plurality of operations are executed aside from the first set of operations. The debugger program may set a breakpoint prior to the first set of operations or, alternatively or addi- tionally, the debugger program may insert instructions caus- ing the first set of contributing values to be written to memory. During the second iteration, the debugger program causes at least a portion of the plurality of operations to be executed, using the systolic array, to generate the second set of contributing values. In some examples, all of the plurality of operations are executed aside from the second set of operations and the first set of operations. The debugger program may set a breakpoint prior to the second set of operations or, alternatively or additionally, the debugger program may insert instructions causing the second set of contributing values to be written to memory.

At step 1214, during the first iteration, at least a portion of the plurality of operations are executed, using the refer- ence processor, to generate a first reference intermediary map containing a first set of reference contributing values. During the second iteration, at least a portion of the plurality of operations are executed, using the reference processor, to generate a second reference intermediary map containing a second set of reference contributing values. In some examples, step 1214 is initialized and/or facilitated by the debugger program.

At step 1216, during the first iteration, the first set of contributing values are compared to the first set of reference contributing values. If it is possible to detect a computation error and/or a cause of the computation error based on the comparison, then the method 1200 exits the loop and proceeds to step 1218. Otherwise, the method 1200 returns to step 1208. For example, if the first set of contributing values do not differ from the first set of reference contributing values, then the computation error is detected as occurring during the first set of operations. During the second iteration, the second set of contributing values are compared to the second set of reference contributing values. If it is possible to detect a computation error and/or a cause of the computation error based on the comparison, then the method 1200 exits the loop and proceeds to step 1218. For example, if the second set of contributing values do not differ from the second set of reference contributing values, while the first set of contributing values differ from the first set of reference contributing values, then the computation error is detected as occurring during the second set of operations.

At step 1218, the debugger program detects the computation error based on the comparison(s) performed during step(s) 1216. The debugger program may alternatively or additionally determine a cause of the computation error. For example, the debugger program may identify which specific operation is associated with the computation error, whether the computation error was caused by a summing error due to finite precision, whether the computation error was caused by one or more defective processing elements in the systolic array, or the like. The debugger program may output the computation error and/or the cause of the computation error to be viewed and analyzed by a user.

Figure 13:
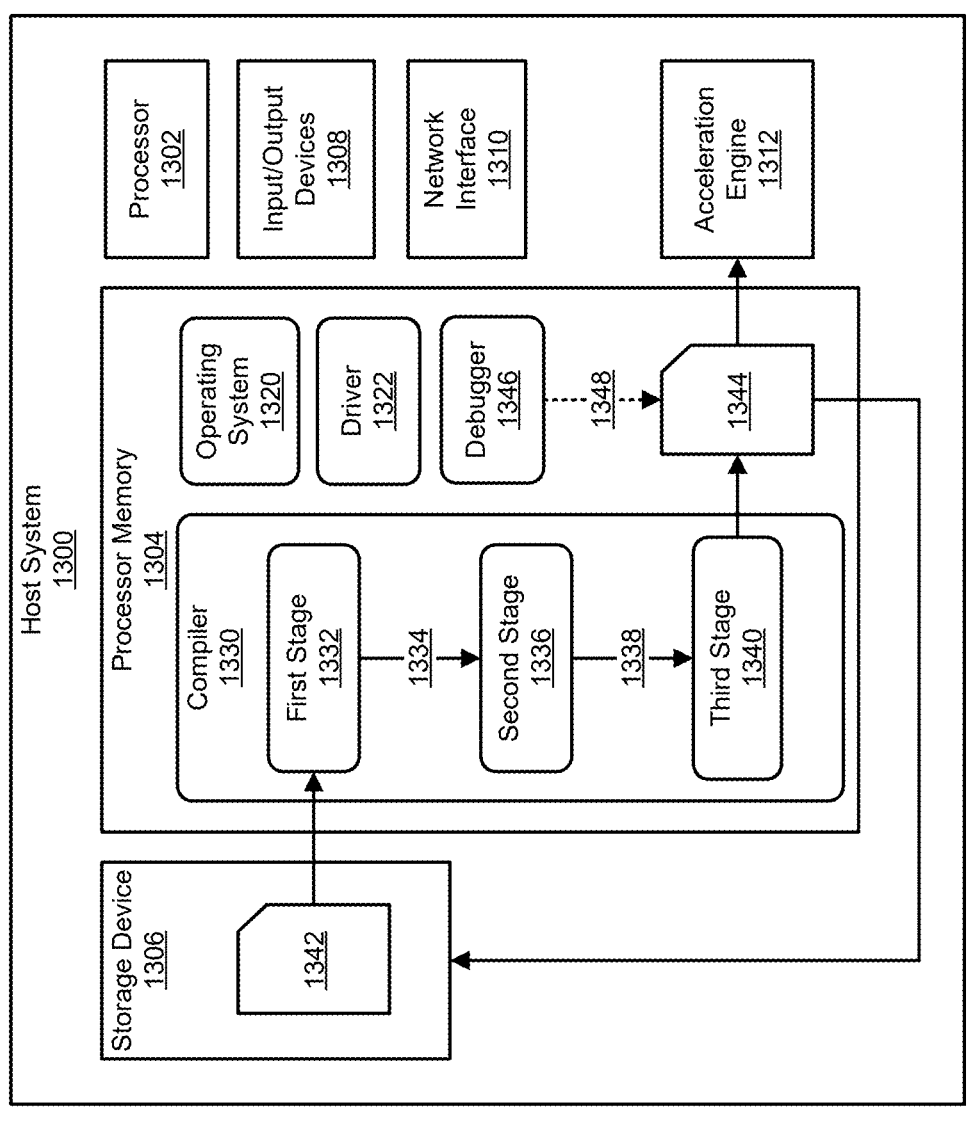
FIG. 13 illustrates an example of a host system on which a debugger, such as are described herein, can run.

FIG. 13 includes a block diagram illustrating an example of a host system 1300 on which a debugger 1346, such as are described herein, can run. The illustrated host system 1300 is an example of a computing device, and includes a processor 1302, a processor memory 1304, at least one storage device 1306, various Input/Output (I/O) devices 1308, and at least one network interface 1310. In the example of FIG. 13, the host system 1300 also includes an acceleration engine 1312, which is an integrated circuit device that can accelerate certain operations or computations performed by the host system 1300. In various examples, the host system 1300 can be implemented as a server in a data center, a desktop computer, a laptop computer, a tablet computer, or a smartphone, among other examples. In some examples, operations or components discussed below as performed or included in the host system 1300 can be performed or included in other computer devices. For example, the compiler 1330 can execute on the host system 1300 while the acceleration engine 1312 is located at a different host system.

The processor 1302 is an integrated circuit device that can execute program code, in the form of instructions. The program code can be used for various software applications or tools, such as an operating system 1320, the debugger 1346, or the illustrated compiler 1330. While the processor 1302 is executing a program, the instructions for the program can be stored in the processor memory 1304. The instructions can also be stored elsewhere, such as on the storage device 1306, and can be loaded into the processor memory 1304 when needed by the processor 1302. The processor 1302 can also use the processor memory 1304 for temporary storage of other data on which the processor 1302 is operating. In various examples, the processor memory 1304 is a volatile memory type, such as a type of Random Access Memory, though non-volatile memory types can, alternatively or additionally, be used for the processor memory 1304.

The storage device 1306 is an example of a device that can include non-volatile memory. For example, the storage device 1306 can be a magnetic disk drive, a solid state drive, or an optical drive, among other examples. The storage device 1306 can further be non-transitory, such that program code and other data stored on the storage device 1306 remains present when the storage device 1306 is not powered on.

The storage device 1306 is one example of a peripheral device, which are components that can be coupled to the host system 1300 to add functionality to the host system 1300. Other examples of peripheral devices include the Input/Output devices 1308 and the network interface 1310. The Input/Output devices 1308 can include user input and output devices, such as keyboards, mice, touch screens, microphones, display screens, speakers, printers, and scanners, among other examples. The network interface 1310, which can be implemented using a network interface card, can provide access to one or more networks. The network interface 1310 can include, for example, a physical port for connecting a network cable and/or wireless antennas for communicating with Wi-Fi and/or cellular networks. The network interface 1310 can also be described as an I/O device.

The acceleration engine 1312 is also another type of peripheral device or I/O device. The acceleration engine 1312 is a device that is purpose built to perform certain operations that can be performed by the processor 1302, but can be performed faster by the acceleration engine 1312. For example, the acceleration engine 1312 can be a neural network accelerator, and, as such, may be able to perform the large scale, parallel computations of a neural network more efficiently than when the computations are performed by the processor 1302. As another example, the acceleration engine 1312 can be a GPU, and may be optimized to perform the computations needed for graphics rendering. Other examples of devices that can be implemented by the acceleration engine 1312 include cryptographic accelerators, compression and decompression accelerators, 3-D accelerators, regular expression accelerators, security accelerators, and others.

In various examples, the acceleration engine 1312 can execute program code to perform certain operations. For example, when the acceleration engine 1312 is a neural network accelerator, the acceleration engine 1312 can be programmed to execute a particular neural network, such as one that performs image recognition or one that performs machine translation. As a further example, to support the execution of a neural network, the acceleration engine 1312 can be programed to perform operations such as copying data for the neural network from processor memory 1304 (for example) into the acceleration engine 1312, copying input data for the neural network from processor memory 1304 into the acceleration engine 1312, and/or copying results from the acceleration engine 1312 into the processor memory 1304, among other examples.

To generate program code for the acceleration engine 1312, in various examples, the host system 1300 can execute the compiler 1330. Compilers, in general, are software programs that translate program code written in a human-readable language into a format (e.g., machine instructions) that can be read and processed by an integrated circuit device. In the example of FIG. 13, the acceleration engine 1312 is a neural network accelerator and the compiler 1330 is for compiling a neural network description into instructions to be executed on the acceleration engine 1312. When the acceleration engine 1312 implements a different type of accelerator, another compiler can be used.

The compiler 1330 can be activated, for example, when the operating system 1320 receives keyboard, mouse, touchscreen, voice commands, or other inputs from the Input/Output devices 1308. The inputs can further include parameters for the compiler 1330, such as the input code 1342 to compile and configuration options for the compilation process. Once the compiler 1330 is activated, the processor 1302 can load the instructions for the compiler 1330 into the processor memory 1304, and can execute the instructions.

In the example of FIG. 13, the compiler 1330 includes a first stage 1332, a second stage 1336, and a third stage 1340, which each perform different operations to produce compiled code 1344. In other examples, the compiler 1330 can combine the operations of the first stage 1332, second stage 1336, and/or third stage 1340 into fewer stages, or can divide the operations of one of the stages into multiple stages.

The first stage 1332 can receive and process input code 1342. The input code 1342 can describe a program in a high-level programming language, such as Java, C++, or Tensorflow, among many other examples. The input code 1342 can describe, for example, steps to perform image recognition, speech recognition, machine translation, or other operations. The input code 1342 can be obtained, for example, from the storage device 1306. Alternatively, though not illustrated here, the input code 1342 may be located in the processor memory 1304 or can be obtained from a network location, using the network interface 1310. Processing of the input code 1342 can include sorting the operations described in the input code 1342 into layers, where the outputs of one layer provide the inputs to a next layer. Processing can also include identifying steps to be performed by the processor 1302, rather than by the acceleration engine 1312. For example, the processor 1302, through the execution of a driver 1322, may need to perform steps such as configuring Direct Memory Access (DMA) descriptors for moving data into or out of the acceleration engine 1312, among other examples.

The output 1334 of the first stage 1332 can be organized, for example, in the layers, nodes, and connections between nodes of a neural network. The second stage 1336 can perform intermediate processing on this output 1334. For example, the operations performed in any one layer, or at any one node in a layer, may be too many for the acceleration engine 1312 to perform at the same time. The acceleration engine 1312 may, for example, have a limited amount of local storage space for the data needed for a computation, or the computations may be more than the acceleration engine 1312 can perform at one time. In this example, the first stage 1332 can break the operations of the layer or node down into smaller operations, which can fit into the acceleration engine's local memory and/or can fit into the computing capacity of the acceleration engine 1312. Processing of the output 1334 of the first stage 1332 can include other steps, such as scheduling, or determining the order in which the acceleration engine 1312 and/or processor 1302 will perform operations, among other examples.

In various examples, the output 1338 of the second stage 1336 includes the various steps to be performed by components of the acceleration engine 1312, in the order that the steps are to be performed. The output 1338 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1340 can operate on the output 1338 of the second stage 1336, and perform various steps before producing the instructions that are to be executed by the acceleration engine 1312. These steps can include, for example, removing redundant dependencies, resolving or handling dependencies between nodes by inserting synchronization instructions into the code, identifying possible optimizations in memory usage or memory bandwidth usage, and other operations.

The output of the third stage 1340 is compiled code 1344, which may include machine instructions in binary format. In some examples, the compiled code 1344 can be stored in the processor memory 1304. Alternatively or additionally, the compiled code 1344 can be copied to the storage device 1306 or to a network location. As noted above, the acceleration engine 1312 may be located at a different host system, in which case the compiled code 1344 can be sent over the network interface 1310 to the other host system.

In the example of FIG. 13, the host system 1300 can execute a driver 1322, which can also be referred to as a device driver or runtime driver, that manages the acceleration engine 1312. The driver 1322 can provide an interface between applications executing on the host system 1300 (or on another host system) and the acceleration engine 1312. For example, the driver 1322 can provide an Application Program Interface (API) that defines functions for feeding input data to the acceleration engine 1312 and defining the operation to perform on the input data. In this and other examples, the driver 1322 can configure the acceleration engine 1312 to perform the operation. For example, the driver 1322 can identify a neural network that the acceleration engine 1312 is to execute, as well as the location in the processor memory 1304 or on the storage device 1306 where the compiled code 1344 for the neural network is located. The driver 1322 can further load into the acceleration engine 1312 or cause the acceleration engine 1312 to load the compiled code 1344, can load or cause the acceleration engine 1312 to load the input data on which the neural network is to operate, and/or can cause the acceleration engine 1312 to begin executing on the input data. Once the acceleration engine 1312 has finished, the acceleration engine 1312 can notify the driver 1322, and the driver 1322 can deliver a result back to the application that requested the result.

In some embodiments, the host system 1300 can be execute a debugger 1346, an application that can be used to debug, examine, and/or improve the functionality of the neural network. The debugger 1346 may allow a user to examine the inputs and outputs of different layers and nodes of the neural network by setting breakpoints in the compiled code 1344. A breakpoint is a point at which executing code will halt further execution, with all execution state prior to the breakpoint being preserved. In various examples, a breakpoint can be assigned to a specific instruction, a particular function call, a program counter value, or an otherwise-identified part of a program's code. Once a breakpoint is reached, the debugger can enable a user to see the current values of variables, the current contents of system memory, and/or to step through the program code one or multiple instructions at a time, among other operations.

In some instances, to insert a breakpoint, the debugger 1346 can modify the compiled code 1344 by, for example, by inserting halt points into the code (e.g., by inserting a halt instruction between two already existing instructions, by modifying a halt bit of an already existing instruction, etc.).

The debugger 1346 may operate on the host system 1300 concurrently with the operating system 1320, the compiler 1330, the driver 1322, and/or the application that invokes operation of the acceleration engine 1312. In one particular implementation, a user causes the host system 1300 to be powered on and the operating system 1320 is initialized. Using the operating system 1320, the user can cause the compiler 1330 to generate the compiled code 1344 and may thereafter invoke the debugger 1346 to analyze the compiled code 1344. The user then initializes the application that invokes operation of the acceleration engine 1312 and uses the debugger 1346 to debug the neural network. In some examples, the compiled code 1344 is generated prior to powering on the host system 1300. Upon powering on the host system 1300, the user initializes the debugger 1346 and then initializes the application that invokes operation of the acceleration engine 1312, or alternatively, the user initializes the application and subsequently initializes the debugger 1346. Other possibilities are contemplated.

Figure 14:
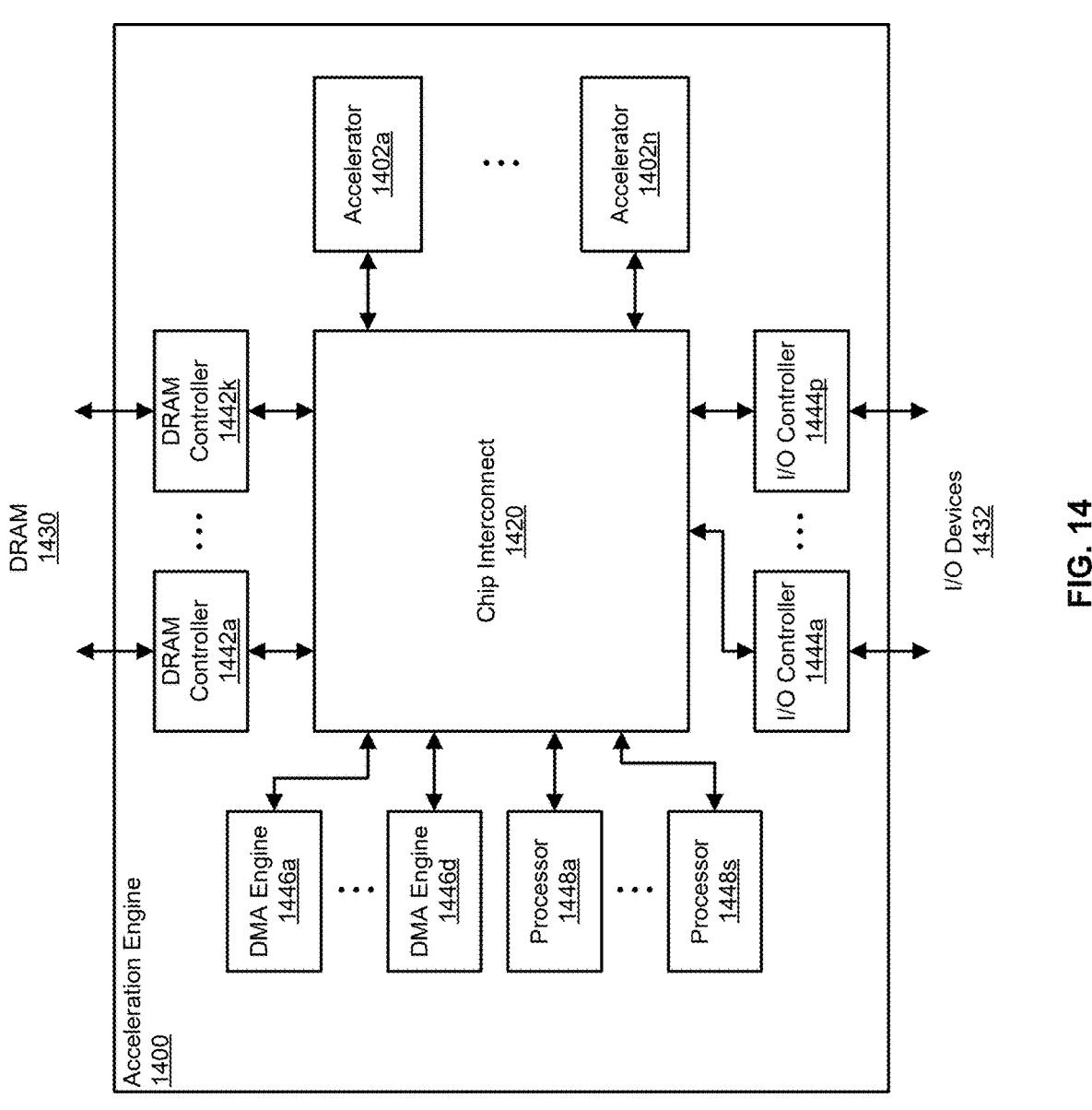
FIG. 14 illustrates an example of an integrated circuit device.

FIG. 14 includes a block diagram illustrating an example of an integrated circuit. The example of FIG. 14 illustrates an acceleration engine 1400. In the example of FIG. 14, the acceleration engine 1400 includes multiple accelerators 1402a-1402n, each of which can perform a set of operations. In various examples, the accelerators 1402a-1402n for particular types of operations, so that the accelerators 1402a-1402n can perform the operations much faster than when similar operations are performed by a general purpose processor. In various examples, to perform a set of operations, input data on which the operations are to be performed must first be moved into the accelerators 1402a-1402n. Additionally, in some cases, program code is also moved into the accelerators 1402a-1402n, which programs the operations that the accelerators 1402a-1402n will perform on the data. In the illustrated example, the acceleration engine 1400 includes n accelerators 1402a-1402n. Examples of accelerators that can be included in the acceleration engine 1400 include graphics accelerators, floating point accelerators, neural network accelerators, and others. In various examples, the accelerators 1402a-1402n can each be the same (e.g., each of the is a graphics accelerator) or can be different (e.g., the accelerators 1402a-1402n include a graphics accelerator, a floating point accelerator, and neural network accelerator).

The example acceleration engine 1400 further includes DRAM controllers 1442a-1442k for communicating with an external memory. The external memory is implemented, in this example, using DRAM 1430. In the illustrated example, the acceleration engine 1400 includes k DRAM controllers 1442a-1442k, each of which may be able to communicate with an independent set of banks of DRAM. In other examples, other types of RAM technology can be used for the external memory. The DRAM controllers 1442a-1442k can also be referred to as memory controllers.

In various examples, input data and/or program code for the accelerators 1402a-1402n can be stored in the DRAM 1430. Different programs can cause the accelerators 1402a-1402n to perform different operations. For example, when one of the accelerators is a neural network accelerator, one program can configure the neural network accelerator to perform speech recognition while another program can configure the neural network accelerator to perform image recognition. In various examples, different accelerators 1402a-1402n can be programmed with different programs, so that each performs a different set of operations. In various examples, the processors 1448a-1448s can manage moving of program code from the DRAM 1430 to the accelerators 1402a-1402n.

The example acceleration engine 1400 further includes I/O controllers 1444a-1444p for communicating with I/O devices 1432 in the system. The acceleration engine 1400 can communicate with I/O devices over, for example, a processor bus. In some examples, the processor bus can be implemented using Peripheral Component Interconnect (PCI) and/or a variation of the PCI bus protocol. The processor bus can connect the acceleration engine 1400 to I/O devices such as, for example, input and output devices, memory controllers, storage devices, and/or network interface cards, among other things. In some examples, the I/O controllers 1444-1444p can enable the acceleration engine 1400 to act as an I/O device for a host processor. For example, the acceleration engine 1400 can be the recipient of input data from the host processor, and a command indicating an operation to be performed on the input data (e.g., a particular computation or analysis). In the illustrated example, the acceleration engine 1400 includes p I/O controllers 1444a-1444p, each of which may include a separate root complex and may communicate with a separate set of I/O devices 1432. In other examples, other standardized bus protocols, such as Ultra Path Interconnect (UPI) can be used for the host bus. In other examples, a proprietary bus protocol can be used.

Movement of data in the acceleration engine 1400 can be managed by one or more processors 1448a-1448s, which can also be referred to as data management processors. In the example of FIG. 14, the acceleration engine 1400 includes s processors 1448a-1448s incorporated into (e.g., on the same silicon die) the device. In other examples, the processors 1448a-1448s can be external to the acceleration engine 1400 (e.g., on a different die and/or in a different package). In some examples, the processors 1448a-1448s can manage the movement of data from I/O devices 1432 to the accelerators 1402a-1402n or the DRAM 1430. For example, input data may be located at an I/O device 1432 or in processor memory, and the processors 1448a-1448s can move the input from the I/O device 1432 or processor memory into an accelerator or into DRAM 1430. As another example, program code for the accelerators 1402a-1402n may be located on an I/O device 1432 or in processor memory.

The example acceleration engine 1400 further includes DMA engines 1446a-1446d that can move data between the accelerators 1402a-1402n, DRAM controllers 1442a-1442k, and I/O controllers 1444a-1444p. In the illustrated example, the acceleration engine 1400 includes d DMA engines 1446a-1446d. In some implementations, the DMA engines 1446a-1446d can be assigned to specific tasks, such as moving data from the DRAM controllers 1442a-1442d to the accelerators 1402a-1402n, or moving data between the I/O controllers 1444a-1444p and the accelerators 1402a-1402n. These tasks can be assigned, for example, by enqueueing descriptors with the DMA engines 1446a-1446d, where a descriptor identifies an address for a block of data and an operation (e.g., a read or a write) to perform. A descriptor, for example, can direct a DMA engine to instruct a DMA controller to read a block of data from DRAM 1430. A descriptor can, as a further example, instruct the DMA engine to write data, read by the DMA controller, to an accelerator. Further descriptors can be used to move data from an accelerator to DRAM 1430.

In various examples, each of the processors 1448a-1448s can be responsible for managing the data movement for a different accelerator. In some examples, a processor may manage the data movement for more than one accelerator. Similarly, in various examples, each of the processors 1448a-1448s can be assigned to one or more DMA engines 1446a-1446d. In these and other examples, associations between processors 1448a-1448s, accelerators 1402a-1402n, and DMA engines 1446a-1446d is determined by program code being executed by each respective processor.

In the example acceleration engine 1400, the various components can communicate over a chip interconnect 1420. The chip interconnect 1420 primarily includes wiring for routing data between the components of the acceleration engine 1400. In some cases, the chip interconnect 1420 can include a minimal amount of logic, such as multiplexors to control the direction of data, flip-flops for handling clock domain crossings, and timing logic.

Figure 15:
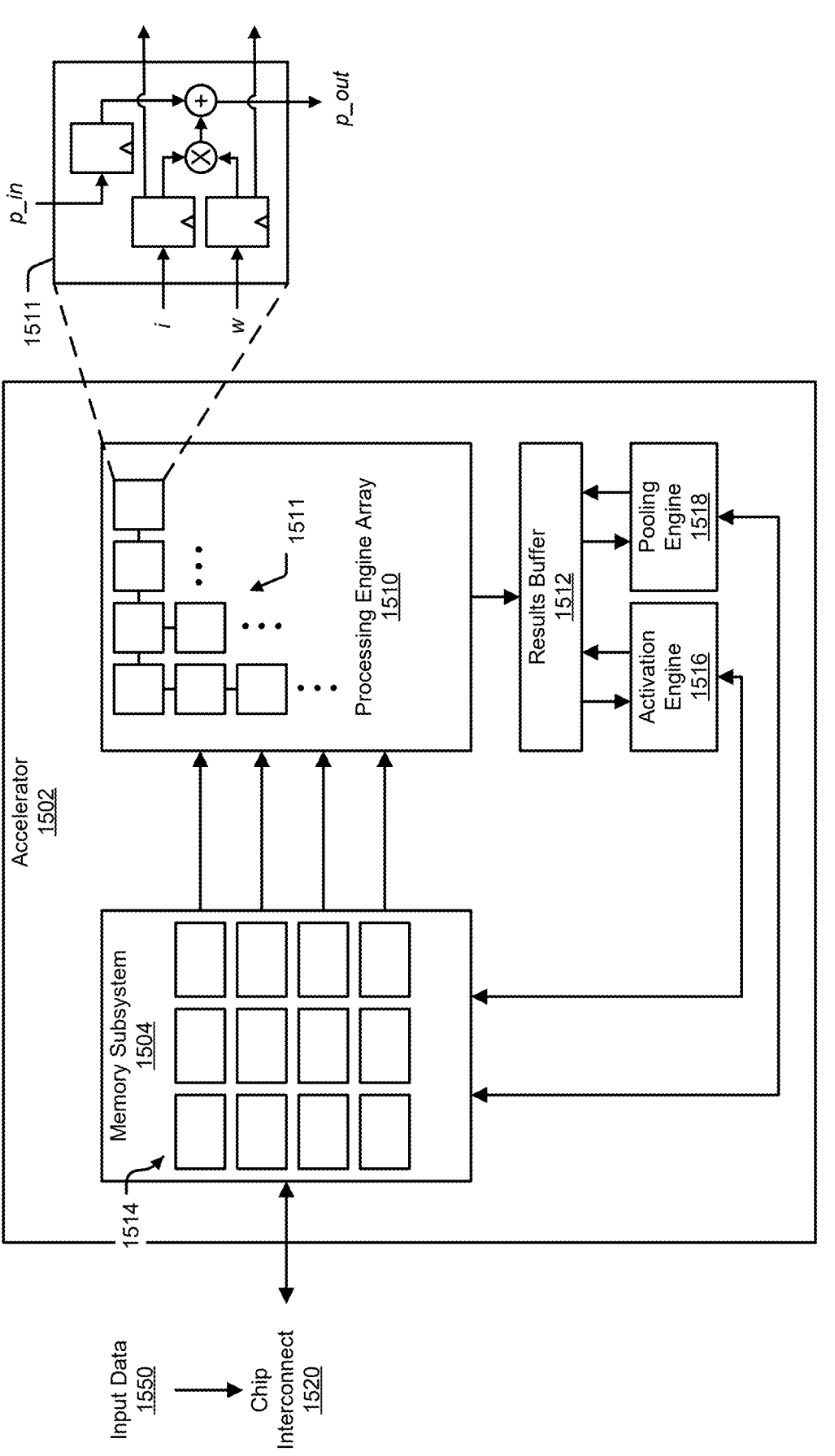
FIG. 15 illustrates an example of an integrated circuit device.

FIG. 15 includes a block diagram illustrating an example of an integrated circuit device. The example of FIG. 15 illustrates an accelerator 1502. In various examples, the accelerator 1502, for a set of input data (e.g., input data 1550), can execute computations using a processing engine array 1510, an activation engine 1516, and/or a pooling engine 1518. In some examples, the example accelerator 1502 may be an integrated circuit component of a processor, such as a neural network processor. The processor may have other integrated circuit components, including additional accelerators.

In various implementations, the memory subsystem 1504 can include multiple memory banks 1514. In these implementations, each memory bank 1514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1504 can permit simultaneous access to the read or write channels of multiple memory banks. As another example, the memory subsystem 1504 can include arbitration logic such that arbitration between, for example, the outputs of multiple memory banks 1514 can result in more than one memory bank's output being used. In these and other examples, though globally managed by the memory subsystem 1504, each memory bank can be operated independently of any other.

Having the memory banks 1514 be independently accessible can increase the efficiency of the accelerator 1502. For example, values can be simultaneously read and provided to each row of the processing engine array 1510, so that the entire processing engine array 1510 can be in use in one clock cycle. As another example, the memory banks 1514 can be read at the same time that results computed by the processing engine array 1510 are written to the memory subsystem 1504. In contrast, a single memory may be able to service only one read or write at a time. With a single memory, multiple clock cycles can be required, for example, to read input data for each row of the processing engine array 1510 before the processing engine array 1510 can be started.

In various implementations, the memory subsystem 1504 can be configured to simultaneously service multiple clients, including the processing engine array 1510, the activation engine 1516, the pooling engine 1518, and any external clients that access the memory subsystem 1504 over a communication fabric 1520. In some implementations, being able to service multiple clients can mean that the memory subsystem 1504 has at least as many memory banks as there are clients. In some cases, each row of the processing engine array 1510 can count as a separate client. In some cases, each column of the processing engine array 1510 can output a result, such that each column can count as a separate write client. In some cases, output from the processing engine array 1510 can be written into the memory banks 1514 that can then subsequently provide input data for the processing engine array 1510. As another example, the activation engine 1516 and the pooling engine 1518 can include multiple execution channels, each of which can be separate memory clients. The memory banks 1514 can be implemented, for example, using static random access memory (SRAM).

In various implementations, the memory subsystem 1504 can include control logic. The control logic can, for example, keep track of the address spaces of each of the memory banks 1514, identify memory banks 1514 to read from or write to, and/or move data between the memory banks 1514. In some implementations, memory banks 1514 can be hardwired to particular clients. For example, a set of memory banks 1514 can be hardwired to provide values to the rows of the processing engine array 1510, with one memory bank servicing each row. As another example, a set of memory banks can be hired wired to receive values from columns of the processing engine array 1510, with one memory bank receiving data for each column.

The processing engine array 1510 is the computation matrix of the example accelerator 1502. The processing engine array 1510 can, for example, execute parallel integration, convolution, correlation, and/or matrix multiplication, among other things. The processing engine array 1510 includes multiple processing engines 1511, arranged in rows and columns, such that results output by one processing engine 1511 can be input directly into another processing engine 1511. Processing engines 1511 that are not on the outside edges of the processing engine array 1510 thus can receive data to operate on from other processing engines 1511, rather than from the memory subsystem 1504.

In various examples, the processing engine array 1510 uses systolic execution, in which data arrives at each processing engine 1511 from different directions at regular intervals. In some examples, input data can flow into the processing engine array 1510 from the left and weight values can be loaded at the top. In some examples weights and input data can flow from the left and partial sums can flow from top to bottom. In these and other examples, a multiply-and-accumulate operation moves through the processing engine array 1510 as a diagonal wave front, with data moving to the right and down across the array. Control signals can be input at the left at the same time as weights, and can flow across and down along with the computation.

In various implementations, the number of columns in the processing engine array 1510 determines the computational capacity of the processing engine array 1510, and the number of rows determines the required memory bandwidth for achieving maximum utilization of the processing engine array 1510. The processing engine array 1510 can have, for example, 64 columns and 128 rows, or some other number of columns and rows.

An example of a processing engine 1511 is illustrated in FIG. 15 in an inset diagram. As illustrated by this example, a processing engine 1511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1511.

In the illustrated example, an input from above can include a partial sum, p_in, provided either from another processing engine 1511 or from a previous round of computation by the processing engine array 1510. When starting a computation for a new set of input data, the top row of the processing engine array 1510 can receive a fixed value for p_in, such as zero. As illustrated by this example, i and w are multiplied together and the result is summed with p_in to produce a new partial sum, p_out, which can be input into another processing engine 1511. Various other implementations of the processing engine 1511 are possible.

Outputs from the last row in the processing engine array 1510 can be temporarily stored in the results buffer 1512. The results can be intermediate results, which can be written to the memory banks 1514 to be provided to the processing engine array 1510 for additional computation. Alternatively, the results can be final results, which, once written to the memory banks 1514 can be read from the memory subsystem 1504 over the communication fabric 1520, to be output by the system.

In some implementations, the accelerator 1502 includes an activation engine 1516. In these implementations, the activation engine 1516 can combine the results from the processing engine array 1510 into one or more output activations. For example, for a convolutional neural network, convolutions from multiple channels can be summed to produce an output activation for a single channel. In other examples, accumulating results from one or more columns in the processing engine array 1510 may be needed to produce an output activation for a single node in the neural network. In some examples, activation engine 1516 can be bypassed.

In various examples, the activation engine 1516 can include multiple separate execution channels. In these examples, the execution channels can correspond to the columns of the processing engine array 1510, and can perform an operation on the outputs of a column, the result of which can be stored in the memory subsystem 1504. In these examples, the activation engine 1516 may be able to perform between 1 and n parallel computations, where n is equal to the number of columns in the processing engine array 1510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1502 can include a pooling engine 1518. Pooling is the combining of outputs of the columns of the processing engine array 1510. Combining can include for example, computing a maximum value, a minimum value, an average value, a median value, a summation, a multiplication, or another logical or mathematical combination. In various examples, the pooling engine 1518 can include multiple execution channels that can operating on values from corresponding columns of the processing engine array 1510. In these examples, the pooling engine 1518 may be able to perform between 1 and n parallel computations, where n is equal to the number of columns in the processing engine array 1510. In various examples, execution channels of the pooling engine 1518 can operate in parallel and/or simultaneously. In some examples, the pooling engine 1518 can be bypassed.

Herein, the activation engine 1516 and the pooling engine 1518 may be referred to collectively as execution engines. The processing engine array 1510 is another example of an execution engine. Another example of an execution engine is a Direct Memory Access (DMA) engine, which may be located outside the accelerator 1502.

Input data 1550 can arrive over the communication fabric 1520. The communication fabric 1520 can connect the accelerator 1502 to other components of a processor, such as a DMA engine that can obtain input data 1550 from an Input/Output (I/O) device, a storage drive, or a network interface. The input data 1550 can be, for example one-dimensional data, such as a character string or numerical sequence, or two-dimensional data, such as an array of pixel values for an image or frequency and amplitude values over time for an audio signal. In some examples, the input data 1550 can be three-dimensional, as may be the case with, for example, the situational information used by a self-driving car or virtual reality data. In some implementations, the memory subsystem 1504 can include a separate buffer for the input data 1550. In some implementations, the input data 1550 can be stored in the memory banks 1514 when the accelerator 1502 receives the input data 1550.

In some examples, the accelerator 1502 can implement a neural network processing engine. In these examples, the accelerator 1502, for a set of input data 1550, can execute a neural network to perform a task for which the neural network was trained. Executing a neural network on a set of input data can be referred to as inference or performing inference.

The weights for the neural network can be stored in the memory subsystem 1504, along with input data 1550 on which the neural network will operate. The neural network can also include instructions, which can program the processing engine array 1510 to perform various computations on the weights and the input data. The instructions can also be stored in the memory subsystem 1504, in the memory banks 1514 or in a separate instruction buffer. The processing engine array 1510 can output intermediate results, which represent the outputs of individual layers of the neural network. In some cases, the activation engine 1516 and/or pooling engine 1518 may be enabled for computations called for by certain layers of the neural network. The accelerator 1502 can store the intermediate results in the memory subsystem 1504 for inputting into the processing engine array 1510 to compute results for the next layer of the neural network. The processing engine array 1510 can further output final results from a last layer of the neural network. The final results can be stored in the memory subsystem 1504 and then be copied out to host processor memory or to another location.

Figure 16:
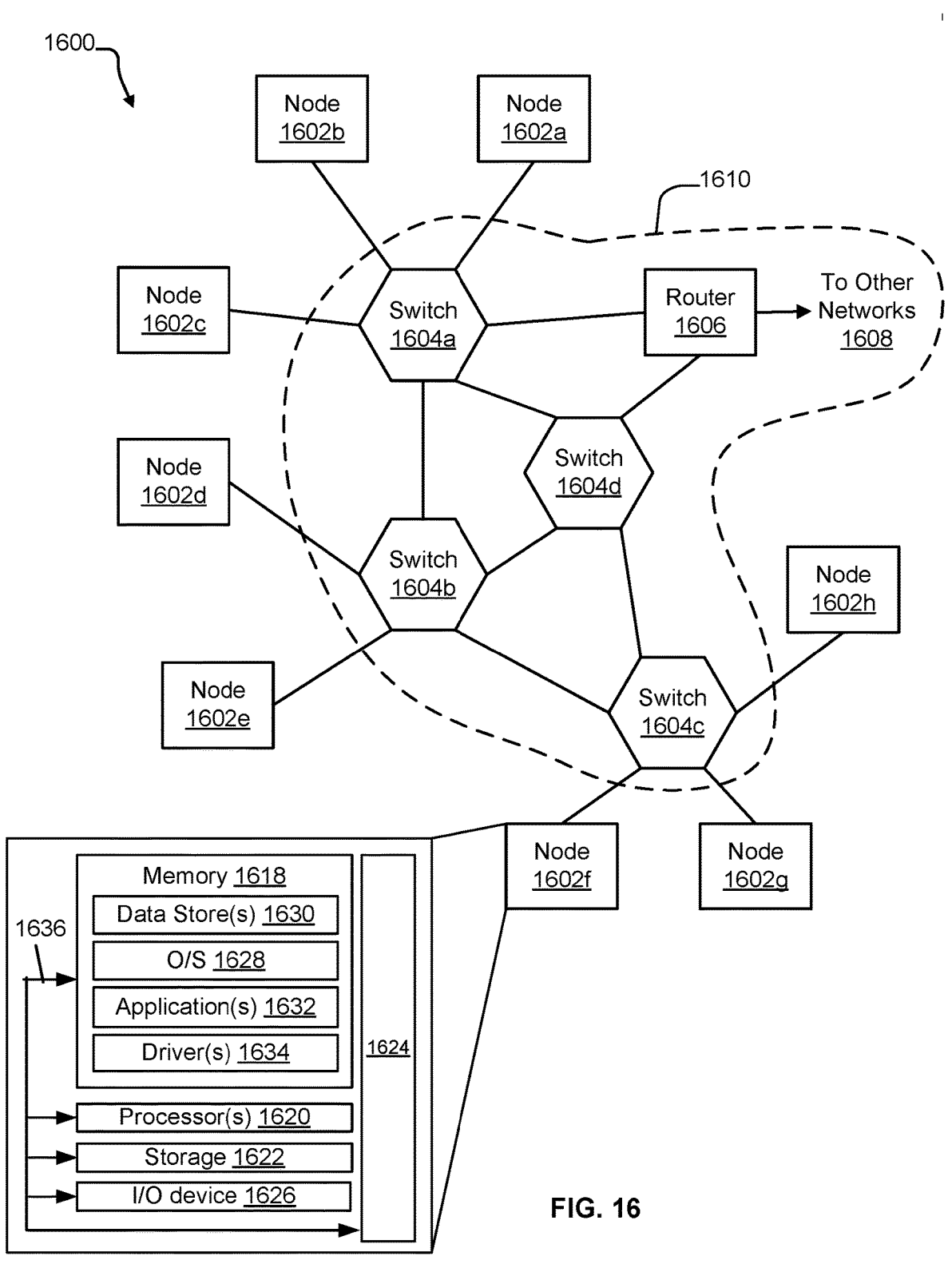
FIG. 16 illustrates a diagram of an example network, which can include one or more host systems.

FIG. 16 includes a diagram of an example network 1600, which can include one or more host systems, such as the host system illustrated in FIG. 13. For example, the example network 1600 of FIG. 16 includes multiple nodes 1602a-1602h, one or more of which can be a host system such as is illustrated in FIG. 13. Others of the nodes 1602*a*-1602*h* can be other computing devices, each of which include at least a memory for storing program instructions, a processor for executing the instructions, and a network interface for connecting to the network 1600.

In various examples, the network 1600 can be used to process data. For example, input data can be received at one of the nodes 1602*a*-1602*h* or from other networks 1608 with which the network 1600 can communicate. In this example, the input data can be directed to a node in the network 1600 that includes an acceleration engine, for the acceleration engine to operate on and produce a result. The result can then be transferred to the node or other network from which the input data was received. In various examples, input data can be accumulated from various sources, including one or more of the nodes 1602*a*-1602*h* and/or computing devices located in the other networks 1608, and the accumulated input data can be directed to one or more host systems in the network 1600. Results from the host systems can then be distributed back to the sources from which the input data was gathered.

In various examples, one or more of the nodes 1602*a*-1602*h* can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 16, the nodes 1602*a*-1602*h* are connected to one another using a switched architecture with point-to point links. The switched architecture includes multiple switches 1604*a*-1604*d*, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1604*a*-1604*d* of FIG. 16 may be connected to the nodes 1602*a*-1602*h* and provide multiple paths between any two nodes.

The network 1600 may also include one or more network devices for connection with other networks 1608, such as a router 1606. Routers use headers and forwarding tables to determine the best path for forwarding the packets, and use protocols such as internet control message protocol (ICMP) to communicate with each other and configure the best route between any two devices. The router 1606 of FIG. 16 can be used to connect to other networks 1608 such as subnets, LANs, wide area networks (WANs), and/or the Internet.

In some examples, network 1600 may include any one or a combination of many different types of networks, such as cable networks, the Internet, wireless networks, cellular networks and other private and/or public networks. The interconnected switches 1604*a*-1604*d* and the router 1606, if present, may be referred to as a switch fabric 1610, a fabric, a network fabric, or simply a network. In the context of a computer network, terms "fabric" and "network" may be used interchangeably herein.

The nodes 1602*a*-1602*h* may be any combination of host systems, processor nodes, storage subsystems, and I/O chassis that represent user devices, service provider computers or third party computers.

User devices may include computing devices to access an application 1632 (e.g., a web browser or mobile device application). In some aspects, the application 1632 may be hosted, managed, and/or provided by a computing resources service or service provider. The application 1632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1608. Additionally, the user device(s) may be part of the distributed system managed by, controlled by, or otherwise part of the service provider computer(s) (e.g., a console device integrated with the service provider computers).

The node(s) of FIG. 16 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1602*a*-1602*h* may include at least one memory 1618 and one or more processing units (or processor(s) 1620). The processor(s) 1620 may be implemented in hardware, computer-executable instructions, firmware, or combinations thereof. Computer-executable instruction or firmware implementations of the processor(s) 1620 may include computer-executable or machine-executable instructions written in any suitable programming language to perform the various functions described.

In some instances, the hardware processor(s) 1620 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1618 may store program instructions that are loadable and executable on the processor(s) 1620, as well as data generated during the execution of these programs. Depending on the configuration and type of the node(s) 1602*a*-1602*h*, the memory 1618 may be volatile (such as RAM) and/or non-volatile (such as ROM, flash memory, etc.). The memory 1618 may include an operating system 1628, one or more data stores 1630, one or more application programs 1632, one or more drivers 1634, and/or services for implementing the features disclosed herein.

The operating system 1628 may support nodes 1602*a*-1602*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1628 may also be a proprietary operating system.

The data stores 1630 may include permanent or transitory data used and/or operated on by the operating system 1628, application programs 1632, or drivers 1634. Examples of such data include web pages, video data, audio data, images, user data, and so on. The information in the data stores 1630 may, in some implementations, be provided over the network(s) 1608 to user devices. In some cases, the data stores 1630 may additionally or alternatively include stored application programs and/or drivers. Alternatively or additionally, the data stores 1630 may store standard and/or propri-etary software libraries, and/or standard and/or proprietary application user interface (API) libraries. Information stored in the data stores 1630 may be machine-readable object code, source code, interpreted code, or intermediate code.

The drivers 1634 include programs that may provide communication between components in a node. For example, some drivers 1634 may provide communication between the operating system 1628 and additional storage 1622, network device 1624, and/or I/O device 1626. Alter-natively or additionally, some drivers 1634 may provide communication between application programs 1632 and the operating system 1628, and/or application programs 1632 and peripheral devices accessible to the service provider computer. In many cases, the drivers 1634 may include drivers that provide well-understood functionality (e.g., printer drivers, display drivers, hard disk drivers, Solid State Device drivers). In other cases, the drivers 1634 may pro-vide proprietary or specialized functionality.

The service provider computer(s) or servers may also include additional storage 1622, which may include remov-able storage and/or non-removable storage. The additional storage 1622 may include magnetic storage, optical disks, solid state disks, flash memory, and/or tape storage. The additional storage 1622 may be housed in the same chassis as the node(s) 1602*a*-1602*h* or may be in an external enclosure. The memory 1618 and/or additional storage 1622 and their associated computer-readable media may provide non-volatile storage of computer-readable instructions, data structures, program modules, and other data for the com-puting devices. In some implementations, the memory 1618 may include multiple different types of memory, such as SRAM, DRAM, or ROM.

The memory 1618 and the additional storage 1622, both removable and non-removable, are examples of computer-readable storage media. For example, computer-readable storage media may include volatile or non-volatile, remov-able or non-removable media implemented in a method or technology for storage of information, the information including, for example, computer-readable instructions, data structures, program modules, or other data. The memory 1618 and the additional storage 1622 are examples of computer storage media. Additional types of computer stor-age media that may be present in the node(s) 1602*a*-1602*h* may include, but are not limited to, PRAM, SRAM, DRAM, RAM, ROM, EEPROM, flash memory or other memory technology, CD-ROM, DVD or other optical storage, mag-netic cassettes, magnetic tape, magnetic disk storage or other magnetic storage devices, solid state drives, or some other medium which can be used to store the desired information and which can be accessed by the node(s) 1602*a*-1602*h*. Computer-readable media also includes combinations of any of the above media types, including multiple units of one media type.

Alternatively or additionally, computer-readable commu-nication media may include computer-readable instructions, program modules or other data transmitted within a data signal, such as a carrier wave or other transmission. How-ever, as used herein, computer-readable storage media does not include computer-readable communication media.

The node(s) 1602*a*-1602*h* may also include I/O device(s) 1626, such as a keyboard, a mouse, a pen, a voice input device, a touch input device, a display, speakers, a printer, and the like. The node(s) 1602*a*-1602*h* may also include one or more communication channels 1636. A communication channel 1636 may provide a medium over which the various components of the node(s) 1602*a*-1602*h* can communicate. The communication channel or channels 1636 may take the form of a bus, a ring, a switching fabric, or a network.

The node(s) 1602*a*-1602*h* may also contain network device(s) 1624 that allow the node(s) 1602*a*-1602*h* to com-municate with a stored database, another computing device or server, user terminals and/or other devices on the network(s) 1600.

In some implementations, the network device 1624 is a peripheral device, such as a PCI-based device. In these implementations, the network device 1624 includes a PCI interface for communicating with a host device. The term "PCI" or "PCI-based" may be used to describe any protocol in the PCI family of bus protocols, including the original PCI standard, PCI-X, AGP, and PCIe or any other improve-ment or derived protocols that are based on the PCI proto-cols discussed herein. The PCI-based protocols are standard bus protocols for connecting devices, such as a local periph-eral device to a host device. A standard bus protocol is a data transfer protocol for which a specification has been defined and adopted by various manufacturers. Manufacturers ensure that compliant devices are compatible with comput-ing systems implementing the bus protocol, and vice versa. As used herein, PCI-based devices also include devices that communicate using NVMe. NVMe is a device interface specification for accessing non-volatile storage media attached to a computing system using PCIe. For example, the bus interface module may implement NVMe, and the network device 1624 may be connected to a computing system using a PCIe interface.

A PCI-based device may include one or more functions. A "function" describes operations that may be provided by the network device 1624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of partially executing a neural network on a systolic array of a neural network accelerator to debug an execution of the neural network, the method comprising:

executing, a plurality of operations of the neural network on the systolic array to generate, based on an input feature map, an output feature map having a plurality of output values;

determining a difference between an output value of the plurality of output values and a corresponding reference output value generated by a reference processor;

identifying, through operation backtracking, a first set of operations of the plurality of operations that relate a first set of contributing values of a first intermediary feature map to the output value;

identifying, through operation backtracking, a second set of operations of the plurality of operations that relate a second set of contributing values of a second intermediary feature map to the first set of contributing values;

partially executing the neural network on the systolic array by executing each of the plurality of operations except for the first set of operations to generate, based on the input feature map, the first set of contributing values and by executing each of the plurality of operations except for the first set of operations and the second set of operations to generate, based on the input feature map, the second set of contributing values;

partially executing the neural network on the reference processor by executing each of the plurality of operations except for the first set of operations to generate, based on the input feature map, a first set of reference contributing values and by executing each of the plurality of operations except for the first set of operations and the second set of operations to generate a second set of reference contributing values;

performing a first comparison between the first set of contributing values and the first set of reference contributing values;

performing a second comparison between the second set of contributing values and the second set of reference contributing values; and detecting a computation error related to the execution of the neural network based on the first comparison and the second comparison, wherein the computation error is detected based on one or more of the first set of contributing values differing from one or more of the first set of reference contributing values and one or more of the second set of contributing values not differing from one or more of the second set of reference contributing values.

2. The method of claim 1, further comprising:

identifying the first set of contributing values based on the first set of operations; and identifying the second set of contributing values based on the second set of operations.

3. The method of claim 2, wherein the first set of operations include a convolution operation using a filter, and wherein identifying the first set of contributing values is based on at least one of:

a size of the filter;

a filter stride;

a zero-padding of the filter;

a number of input channels; or a number of output channels.

4. The method of claim 1, further comprising:

identifying a first set of contributing processing elements of the systolic array used for the first set of operations; and identifying a second set of contributing processing elements of the systolic array used for the second set of operations.

5. The method of claim 1, further comprising:

determining a cause of the computation error.

6. A method comprising:

executing a plurality of operations of a neural network on an array of processing elements of an integrated circuit device to generate, based on an input feature map, an output feature map having a plurality of output values;

selecting an output value of the plurality of output values, the output value being erroneous;

identifying a first set of operations of the plurality of operations that relate a first intermediary feature map to the output feature map and a second set of operations of the plurality of operations that relate a second intermediary feature map to the first intermediary feature map;

identifying, based on the first set of operations, a first set of contributing values of the first intermediary feature map that contribute to the output value and, based on the second set of operations, a second set of contributing values of the second intermediary feature map that contribute to the first set of contributing values;

partially executing the neural network on the array of processing elements by executing each of the plurality of operations except for the first set of operations and the second set of operations to generate, based on the input feature map, the second set of contributing values and by executing each of the plurality of operations except for the first set of operations to generate, based on the input feature map, the first set of contributing values;

performing a first comparison between the first set of contributing values and a first set of reference contributing values and a second comparison between the second set of contributing values and a second set of reference contributing values; and detecting a computation error causing the output value to be erroneous based on the first comparison and the second comparison, wherein the computation error is detected based on one or more of the first set of contributing values differing from one or more of the first set of reference contributing values and one or more of the second set of contributing values not differing from one or more of the second set of reference contributing values.

7. The method of claim 6, further comprising:

determining that a difference between the output value and a reference output value exceeds an accuracy threshold, wherein the reference output value is generated using a reference processor based on the input feature map.

8. The method of claim 7, wherein the first set of reference contributing values is generated using the reference processor based on the input feature map.

9. The method of claim 6, further comprising:

determining a cause of the computation error, wherein the cause of the computation error is either:

a defective processing element of the array of processing elements; or a summing error due to finite precision.

10. The method of claim 6, wherein the first set of operations include a convolution operation using a filter, and wherein identifying the first set of contributing values is based on at least one of:

a size of the filter;

a filter stride;

a zero-padding of the filter;

a number of input channels; or a number of output channels.

11. The method of claim 6, further comprising:

identifying a first set of contributing processing elements of the array of processing elements used for the first set of operations.

12. A non-transitory computer-readable medium comprising instructions that, when executed by a processor, cause the processor to perform operations comprising:

executing a plurality of operations of a neural network on an array of processing elements of an integrated circuit device to generate, based on an input feature map, an output feature map having a plurality of output values;

selecting an output value of the plurality of output values, the output value being erroneous;

identifying a first set of operations of the plurality of operations that relate a first intermediary feature map to the output feature map and a second set of operations of the plurality of operations that relate a second intermediary feature map to the first intermediary feature map;

identifying, based on the first set of operations, a first set of contributing values of the first intermediary feature map that contribute to the output value and, based on the second set of operations, a second set of contributing values of the second intermediary feature map that contribute to the first set of contributing values;

partially executing the neural network on the array of processing elements by executing each of the plurality of operations except for the first set of operations and the second set of operations to generate, based on the input feature map, the second set of contributing values and by executing each of the plurality of operations except for the first set of operations to generate, based on the input feature map, the first set of contributing values;

performing a first comparison between the first set of contributing values and a first set of reference contributing values and a second comparison between the second set of contributing values and a second set of reference contributing values; and detecting a computation error causing the output value to be erroneous based on the first comparison and the second comparison, wherein the computation error is detected based on one or more of the first set of contributing values differing from one or more of the first set of reference contributing values and one or more of the second set of contributing values not differing from one or more of the second set of reference contributing values.

13. The non-transitory computer-readable medium of claim 12, wherein the operations further comprise:

determining that a difference between the output value and a reference output value exceeds an accuracy threshold, wherein the reference output value is generated using a reference processor based on the input feature map.

14. The non-transitory computer-readable medium of claim 13, wherein the first set of reference contributing values is generated using the reference processor based on the input feature map.

15. The non-transitory computer-readable medium of claim 12, wherein the operations further comprise:

determining a cause of the computation error is either:

a defective processing element of the array of processing elements; or a summing error due to finite precision.

16. The non-transitory computer-readable medium of claim 12, wherein the operations further comprise:

identifying a first set of contributing processing elements of the array of processing elements used for the first set of operations.

* * * * *